United States Patent
Lui et al.

(10) Patent No.: US 6,339,426 B1
(45) Date of Patent: Jan. 15, 2002

(54) METHODS, APPARATUS AND DATA STRUCTURES FOR OVERSCALING OR OVERSAMPLING CHARACTER FEATURE INFORMATION IN A SYSTEM FOR RENDERING TEXT ON HORIZONTALLY STRIPED DISPLAYS

(75) Inventors: Charlton E. Lui, Redmond, WA (US); Leroy B. Keely, Jr., Portola Valley, CA (US); Gregory C. Hitchcock, Woodinville; Ryan E. Cukierman, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/301,904

(22) Filed: Apr. 29, 1999

(51) Int. Cl.$^7$ ................................................ G06T 11/00
(52) U.S. Cl. ..................... 345/467; 345/469.1; 345/470; 345/690; 345/947
(58) Field of Search ................................ 345/147, 150, 345/151, 152, 153, 154, 155, 136–138, 467, 468, 469, 469.1, 470, 471, 472, 472.1–472.3, 690, 695, 698, 17, 26, 48, 947

(56) References Cited

U.S. PATENT DOCUMENTS

| | | | |
|---|---|---|---|
| 5,057,739 A | 10/1991 | Shimada et al. | 313/477 R |
| 5,122,783 A | 6/1992 | Bassetti, Jr. | 340/701 |
| 5,298,915 A | 3/1994 | Bassetti, Jr. et al. | 345/149 |
| 5,334,996 A | 8/1994 | Tanigaki et al. | 345/152 |
| 5,341,153 A | 8/1994 | Benzschawel et al. | 345/152 |
| 5,349,451 A | 9/1994 | Dethardt | 358/518 |
| 5,467,102 A | 11/1995 | Kuno et al. | 345/1 |
| 5,543,819 A | 8/1996 | Farwell et al. | 345/150 |

(List continued on next page.)

OTHER PUBLICATIONS

"How Does Hinting Help?" http://www.microsoft.com/typography/hinting/how.htm?fname=%&fsize, Jun. 30, 1997.
"The Raster Tragedy at Low Resolution" http://www.microsoft.com/typography/tools/trtalr.htm?fname=%20&fsize.
"The TrueType Rasterizer" http://www.microsoft.com/typography/what/raster.htm?fname=%20&fsize Jun. 30, 1997.

(List continued on next page.)

*Primary Examiner*—Matthew Luu
*Assistant Examiner*—Thu-Thao Havan
(74) *Attorney, Agent, or Firm*—Workman, Nydegger & Seeley

(57) ABSTRACT

The resolution of text rendered on a display device having sub-pixel elements, such as an RGB LCD for example, and in particular, on a display device having horizontal striping is enhanced by (i) overscaling (or oversampling) character outline information in the vertical (or Y) direction, and (ii) filtering displaced information from the overscaled (or oversampled) character outline information. Metrics associated with character outline information may be appropriately adjusted. The vertical (or Y) position of the baseline of adjacent characters may be constrained by forcing the first pixel above the baseline to be composed of a full number N of scan conversion source samples, where N corresponds to an overscaling (or oversampling) factor. Groups of scan conversion source samples may be converted into packed pixel index values. Color values may be selectively filtered when the differences in the intensity of adjacent sub-pixel elements would otherwise be irritating to view. Finally, the gamma of the pixel values may be corrected so that the gamma of the display device is considered and so that intensity values of sub-pixel elements fall within a range of intensities in which gamma correction is more useful.

61 Claims, 25 Drawing Sheets

U.S. PATENT DOCUMENTS

| | | | |
|---|---|---|---|
| 5,548,305 A | 8/1996 | Rupel | 345/150 |
| 5,555,360 A | 9/1996 | Kumazaki et al. | 395/143 |
| 5,633,654 A | 5/1997 | Kennedy, Jr. et al. | 345/114 |
| 5,689,283 A | 11/1997 | Shirochi | 345/132 |
| 5,767,837 A | 6/1998 | Hara | 345/152 |
| 5,821,913 A | 10/1998 | Mamiya | 345/88 |
| 5,847,698 A | 12/1998 | Reavey et al. | 345/173 |
| 5,894,300 A | 4/1999 | Takizawa | 345/115 |
| 5,949,643 A | 9/1999 | Batio | 361/681 |
| 5,963,175 A | 10/1999 | Havel | 345/83 |
| 6,188,385 B1 * | 2/2001 | Hill et al. | 345/136 |

OTHER PUBLICATIONS

"TrueType fundamentals" http://www.microsoft.com/OTSPEC/TTCHO1.htm?fname=%20&fsize=Nov. 16, 1997.

"True Type Hinting" http://www.microsoft.com/typography/hinting/hinting.htm Jun. 30, 1997.

* cited by examiner

FIG. 1
(PRIOR ART)

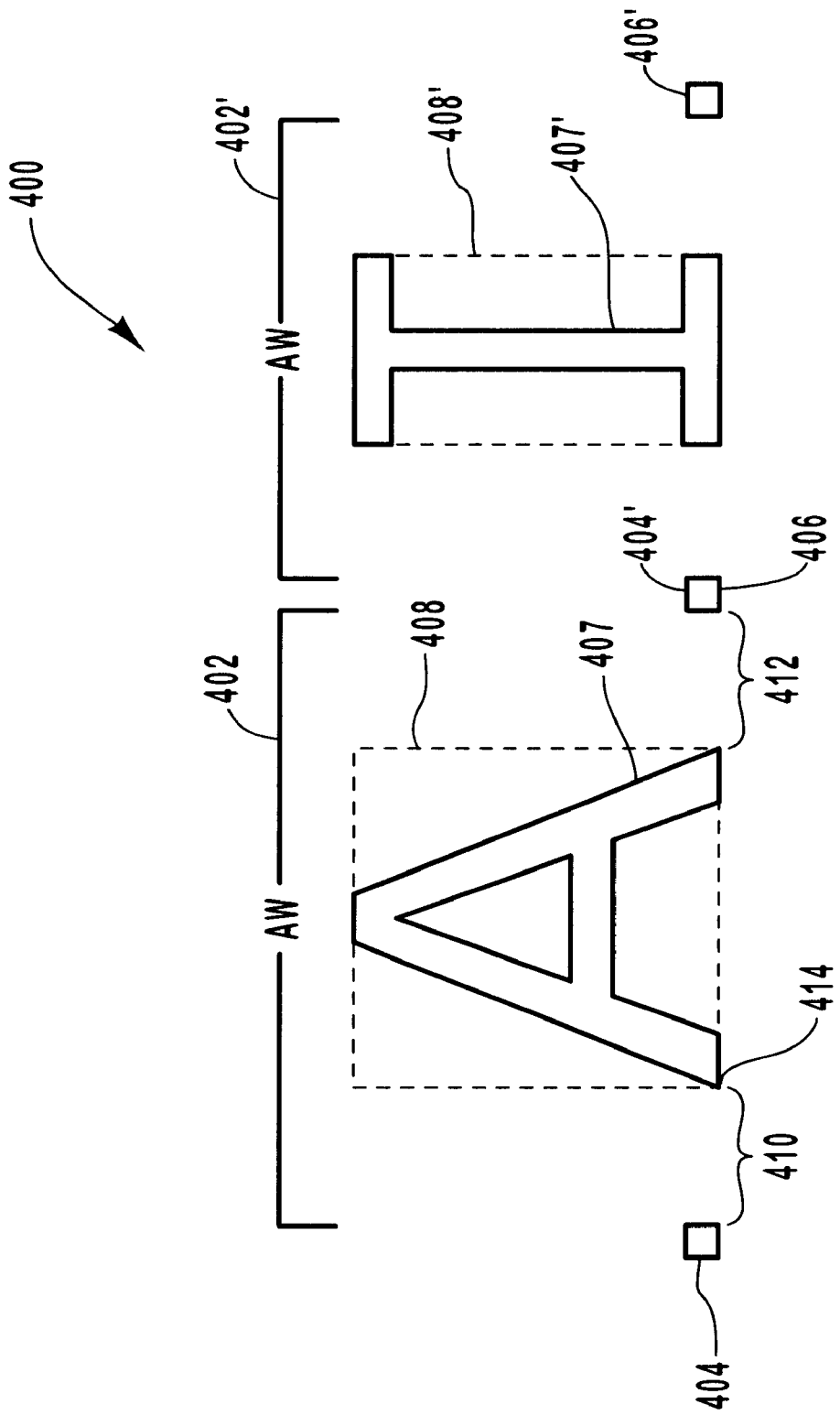

METHODS, APPARATUS AND DATA STRUCTURES FOR OVERSCALING OR OVERSAMPLING CHARACTER FEATURE INFORMATION IN A SYSTEM FOR RENDERING TEXT ON HORIZONTALLY STRIPED DISPLAYS

§ 1. BACKGROUND OF THE INVENTION

§ 1.1 FIELD OF THE INVENTION

The present invention concerns producing more legible text on video displays, such as flat panel video monitors including liquid crystal display (or LCD) video monitors for example, having horizontal striping.

§ 1.2 RELATED ART

The present invention may be used in the context of flat panel video monitors, such as LCD video monitors for example. In particular, the present invention may be used as a part of processing to produce more legible text on LCD video monitors having horizontal striping.

Color display devices have become the principal display devices of choice for most computer users. Color is rendered on a display monitor by operating the display monitor to emit light (such as a combination of red, green, and blue light for example) which results in one or more colors being perceived by the human eye. Although color video monitors in general, and LCD video monitors in particular, are known to those skilled in the art, they are introduced below for the reader's convenience. In § 1.2.1 below, cathode ray tube (or CRT) video monitors are first introduced. Then, in § 1.2.2 below, LCD video monitors are introduced.

§ 1.2.1 CRT VIDEO MONITORS

Cathode ray tube (CRT) display devices include a screen having phosphor coatings which may be applied as dots in a sequence. A different phosphor coating is normally associated with the generation of different colors, such as red, green, and blue for example. Consequently, repeated sequences of phosphor dots are defined on the screen of the video monitor. One or more electron guns generate electron beams which are swept, typically left to right and top to bottom, across the screen. When a phosphor dot is irradiated by an electron beam, it will glow thereby rendering its associated color, such as red, green and blue for example.

The term "pixel" is commonly used to refer to one spot in a group of spots, such as a rectangular grid of thousands of such spots for example. The spots are selectively activated to form an image on the display device. In most color CRTs, a single triad of red, green and blue phosphor dots cannot be uniquely selected. Consequently, the smallest possible pixel size will depend on the focus, alignment and bandwidth of the electron guns used to excite the phosphor dots. The light emitted from one or more triads of red, green and blue phosphor dots, in various arrangements known for CRT displays, tend to blend together giving, at a distance, the appearance of a single colored light source.

In color displays, the intensity of the light emitted from the additive primary colors (such as red, green and blue for example) can be varied to achieve the appearance of almost any desired color pixel. Adding no color, that is, emitting no light, produces a black pixel. Adding 100 percent of all three (3) colors produces a white pixel.

Having introduced color CRT video monitors, color LCD video monitors are now introduced in § 1.2.2 below.

§ 1.2.2 LCD VIDEO MONITORS

Portable computing devices (also referred to generally as computing appliances or untethered computing appliances) often use liquid crystal displays (LCDs) or other flat panel display devices, instead of CRT displays. This is because flat panel displays tend to be smaller and lighter than CRT displays. In addition, flat panel displays are well suited for battery powered applications since they typically consume less power than comparably sized CRT displays.

Color LCD displays are examples of display devices which distinctly address pixel elements to represent each pixel of an image being displayed. Normally, each pixel element of a color LCD display includes three (3) non-square elements (also referred to as "sub-pixel elements" or "sub-pixel components"). More specifically, each pixel element may include adjacent red, green and blue (RGB) sub-pixel elements. Thus, a set of RGB sub-pixel elements together define a single pixel element. Some LCD displays may have non-square pixels and/or pixels which are defined by more than three (3) sub-pixel elements.

Known LCD displays generally include a series of RGB sub-pixel elements which are commonly arranged to form stripes along the display. The RGB stripes normally run the entire length of the display in one direction. The resulting RGB stripes are sometimes referred to as "RGB striping". Many LCD monitors, used for computer applications, are wider than they are tall, and tend to have RGB vertical stripes. On the other hand, many LCD monitors used in untethered or handheld computing appliances are taller than they are wide, and tend to have RGB horizontal stripes. The present invention may be used when rendering text on monitors, such as LCD RGB monitors for example, which have horizontal striping.

FIG. 1 illustrates a known LCD screen 100 comprising pixels arranged in a plurality of rows (R1–R8) and columns (C1–C6). That is, a pixel is defined at each row-column intersection. Each pixel includes a red sub-pixel element, depicted with hatching, a green sub-pixel element, depicted with cross hatching, and a blue sub-pixel element, depicted with no hatching. FIG. 2 illustrates the upper portion of the known display 100 in greater detail. Note how each pixel element, e.g., the (R1, C6) pixel element, comprises three distinct sub-pixel elements or sub-pixel components; a red sub-pixel element 210, a green sub-pixel element 220 and a blue sub-pixel element 230. Each known sub-pixel element 210, 220, 230 is ⅓, or approximately ⅓, the height of a pixel while being equal, or approximately equal, in width to the width of a pixel. Thus, when combined, the three ⅓ height, full width, sub-pixel elements 210, 220, 230 define a single pixel element.

Referring back to FIG. 1, one known arrangement of RGB pixel sub-components 210, 220, 230 define horizontal color stripes on the display 100. Accordingly, the arrangement of ⅓ height color sub-pixel elements 210, 220, 230, in the known manner illustrated in FIGS. 1 and 2, exhibit what is sometimes called "horizontal striping.".

In known systems, the RGB sub-pixel elements are generally addressed and used as a group to generate a single colored pixel corresponding to a single sample of the image to be represented. More specifically, in known systems, luminous intensity values for all of the sub-pixel elements of a pixel element are generated from a single sample of the image to be represented. For example, referring to FIG. 3, an image section 300 is segmented into twelve (12) squares by the grid 310. Each square of the grid 310 defined by the segmented image section 300 represents an area of the image section 300 which is to be represented by a single pixel element. In FIG. 3, a hatched circle 320 is used to represent a single image sample from which luminous intensity values associated with the red, green, and blue sub-pixel elements 330, 332, and 334 of the associated pixel are generated.

Having introduced the general structure and operation of known LCD displays, known techniques for rendering text on such LCD displays, as well as perceived shortcomings of such known techniques, are introduced in § 1.2.2.1 below.

§ 1.2.2.1 RENDERING TEXT ON LCD DISPLAYS

Apart from pure image or video information, LCD displays are often used for rendering textual information. For example, a personal information manager may be used to render contact information, such as a person's address, telephone number, fax number, and e-mail address for example, on an untethered computing device.

The expression of textual information using font sets is introduced in § 1.2.2.1.1 below. Then, the rendering of textual information using so-called pixel precision and perceived shortcomings of doing so are introduced in § 1.2.2.1.2 below.

§ 1.2.2.1.1 FONT SETS

A "font" is a set of characters of the same typeface (such as Times Roman, Courier New, etc.), the same style (such as italic), the same weight (such as bold and, strictly speaking, the same size). Characters may include symbols, such as the "Parties MT", "Webbing", and "Windings" symbol groups found on the Word™ word processor from Microsoft Corporation of Redmond, Washington for example. A "typeface" is a specific named design of a set of printed characters (e.g., Helvetica Bold Oblique), that has a specified obliqueness (i.e., degree of slant) and stoke weight (i.e., line thickness). Strictly speaking, a typeface is not the same as a font, which is a specific size of a specific typeface (such as 12-point Helvetica Bold Oblique). However, since some fonts are "scalable", the terms "font" and "typeface" may sometimes be used interchangeably. A "typeface family" is a group of related typefaces. For example, the Helvetica family may include Helvetica, Helvetica Bold, Helvetica Oblique and Helvetica Bold Oblique.

Many modern computer systems use font outline technology, such as scalable fonts for example, to facilitate the rendering and display of text. TrueType™ fonts from Microsoft Corporation of Redmond, Wash. are an example of such technology. In such systems, various font sets, such as "Times New Roman," "Onyx," "Courier New," etc. for example, may be provided. The font set normally includes a high resolution outline representation, such as a series of contours for example, for each character which may be displayed using the provided font set. The contours may be straight lines or curves for example. Curves may be defined by a series of points that describe second order Bezier-splines for example. The points defining a curve are typically numbered in consecutive order. The ordering of the points may be important. For example, the character outline may be "filled" to the right of curves when the curves are followed in the direction of increasing point numbers. Thus the high resolution character outline representation may be defined by a set of points and mathematical formulas.

The point locations may be described in "font units" for example. A "font unit" may be defined as the smallest measurable unit in an "em" square, which is an imaginary square that is used to size and align glyphs (a glyph can be thought of as a character). FIG. 9 illustrates an "em" square 910 around a character outline 920 of the letter Q. Historically, an "em" was approximately equal to the width of a capital M. Further, historically, glyphs could not extend beyond the em square. More generally, however, the dimensions of an "em" square are those of the full body height 940 of a font plus some extra spacing. This extra spacing was provided to prevent lines of text from colliding when typeset without extra leading was used. Further, in general, portions of glyphs can extend outside of the em square. The coordinates of the points defining the lines and curves (or contours) may be positioned relative to a baseline 930 (Y coordinate= 0). The portion of the character outline 920 above the baseline 930 is referred to as the "ascent" 942 of the glyph. The portion of the character outline 920 below the baseline 930 is referred to as the "decent" 944 of the glyph. Note that in some languages, such as Japanese for example, the characters sit on the baseline, with no portion of the character extending below the baseline.

The stored outline character representation normally does not represent space beyond the maximum horizontal and vertical boundaries of the character (also referred to as "white space" or "side bearings"). Therefore, the stored character outline portion of a character font is often referred to as a black body (or BB). A font generator is a program for transforming character outlines into bitmaps of the style and size required by an application. Font generators (also referred to as "rasterizers") typically operate by scaling a character outline to a requested size and can often expand or compress the characters that they generate.

In addition to stored black body character outline information, a character font normally includes black body size, black body positioning, and overall character width information. Black body size information is sometimes expressed in terms of the dimensions of a bounding box used to define the vertical and horizontal borders of the black body.

Certain terms used to define a character are now defined with reference to FIG. 4, which illustrates character outlines of the letters A and I 400. Box 408 is a bounding box which defines the size of the black body 407 of the character (A). The total width of the character (A), including white space to be associated with the character (A), is denoted by an advance width (or AW) value 402. The advance width typically starts to a point left of the bounding box 408. This point 404 is referred to as the left side bearing point (or LSBP). The left side bearing point 404 defines the horizontal starting point for positioning the character (A) relative to a current display position. The horizontal distance 410 between the left end of the bounding box 408 and the left side bearing point 404 is referred to as the left side bearing (or LSB). The left side bearing 410 indicates the amount of white space to be placed between the left end of the bounding box 408 of a current character (A) and the right side bearing point of the preceding character (not shown). The point 406 to the right of the bounding box 408 at the end of the advance width 402 is referred to as the right side bearing point (or RSBP). The right side bearing point 406 defines the end of the current character (A) and the point at which the left side bearing point 404' of the next character (I) should be positioned. The horizontal distance 412 between the right end of the bounding box 408 and the right side bearing point 406 is referred to as the right side bearing (or RSB). The right side bearing 412 indicates the amount of white space to be placed between the right end of the bounding box 408 of a current character (A) and the left side bearing point 404' of the next character (I). Note that the left and right side bearings may have zero (0) or negative values. Note also that in characters used in Japanese and other Far Eastern languages, metrics analogous to advance width, left side bearing and right side bearing—namely, advance height (AH), top side bearing (TSB) and bottom side bearing (BSB)—may be used.

As discussed above, a scalable font file normally includes black body size, black body positioning, and overall character width information for each supported character. The black body size information may include horizontal and vertical size information expressed in the form of bounding box 408 dimensions. The black body positioning information may expressed as a left side bearing value 410. Overall character width information may be expressed as an advance width 402.

§ 1.2.2.1.2 RENDERING TEXT TO PIXEL PRECISION

Recall that font generators convert a black body character outline into a bitmap. This conversion may consider the point size of the font to be rendered, and the resolution (e.g., dots per inch, pixels per inch, etc.) of the device (e.g., a video display, a printer, etc.) which will ultimately render the text. Most computer systems force the starting and ending points (Recall, for example, the left side bearing points and the right side bearing points, respectively) of characters to be rendered to be positioned on pixel boundaries. In addition, such computer systems usually force or convert the black body width and the left side bearing to be integer multiples of the pixel size. In known implementations, these constraints are enforced by (i) scaling the size and positioning information included in a character font as a function of the point size and device resolution as just described above, and (ii) then rounding the size and positioning values to integer multiples of the pixel size used in the particular display device. Using pixel size units as the minimum (or "atomic") distance unit produces what is called "pixel precision" since the values are accurate to the size of one (1) pixel.

Rounding size and positioning values of character fonts to pixel precision introduces changes, or errors, into displayed images. Each of these errors may be up to ½ a pixel in size (assuming that values less than ½ a pixel are rounded down and values greater than or equal to ½ a pixel are rounded up). Thus, the overall width of a character may be less precise than desired since the character's AW is (may be) rounded. In addition, the positioning of a character's black body within the total horizontal space allocated to that character may be sub-optimal since the left side bearing is (may be) rounded. At small point sizes, the changes introduced by rounding using pixel precision can be significant.

§ 1.2.3 UNMET NEEDS

In view of the errors introduced when rounding character values to pixel precision as introduced in § 1.2.2.1.2 above, methods and apparatus to improve text resolution are needed. The improvements to the legibility and perceived quality of text should work on displays, such as RGB LCDs for example, with horizontal striping, as well as those with vertical striping.

§ 2 SUMMARY OF THE INVENTION

The present invention increases the resolution of text rendered on a display device having sub-pixel elements, such as an RGB LCD for example, and in particular, on a display device having horizontal striping. The present invention may do so by (i) overscaling (or oversampling) character outline information in the vertical (or Y) direction, and (ii) filtering (e.g., averaging) displaced (either overlapping, immediately adjacent, or spaced) scan conversion source samples from the overscaled (or oversampled) character outline information.

The present invention may also appropriately adjust metrics associated with the character outline information (such as left side bearing, advance width, vertical character size, ascent, descent, etc.).

The present invention may also constrain the vertical (or Y) position of the baseline of adjacent characters by forcing the first pixel above the baseline to be composed of a full number N of scan conversion source samples, where N corresponds to an overscaling (or oversampling) factor. This prevents "jumping" or "bouncing" baselines.

The present invention may also convert groups of scan conversion source samples into packed pixel index values.

The present invention may also selectively filter color values when the differences in the intensity of adjacent sub-pixel elements would otherwise be irritating to view.

Finally, the present invention may correct the gamma of the pixel values (or to achieve an effect similar to gamma correction) so that the gamma of the display device is considered and so that intensity values of sub-pixel elements fall within a range of intensities in which gamma correction is more useful.

§ 3 BRIEF DESCRIPTION OF THE DRAWINGS

FIG. 1 illustrates a known arrangement of sub-pixel elements of an LCD display having horizontal striping.

FIG. 4 illustrates known ways of representing character information.

§ 4 DETAILED DESCRIPTION

Figure 2:
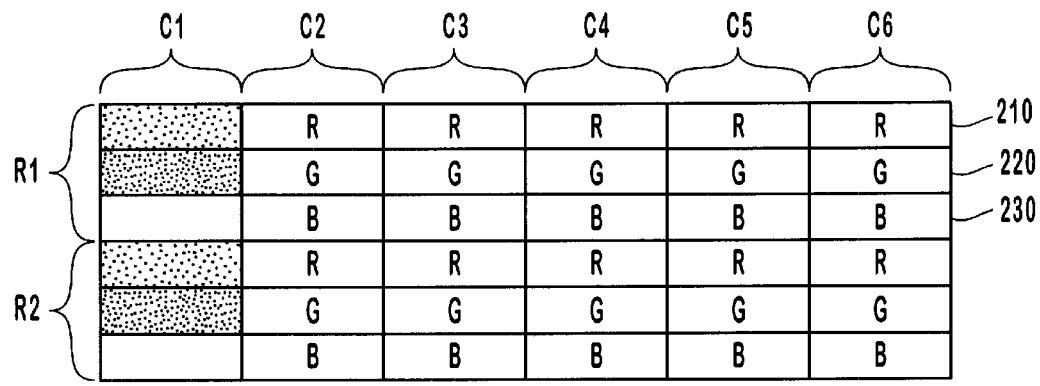
FIG. 2 illustrates a portion of FIG. 1 in greater detail.

The present invention concerns novel methods, apparatus and data structures used to increase the resolution of fonts to be rendered on displays, such as RGB LCD displays for example, having horizontal striping. The following description is presented to enable one skilled in the art to make and use the invention, and is provided in the context of a particular application and its requirements. Various modifications to the disclosed embodiments will be apparent to those skilled in the art, and the general principles set forth below may be applied to other embodiments and applications. Thus, the present invention is not intended to be limited to the embodiments shown.

The methods, apparatus and data structures of the present invention are described in the context of a system for improving the readability of text on flat panel screens. In § 4.1, functions which may be performed by the present invention are introduced. Next, in § 4.2, exemplary processes, methods and data structures for performing the present invention are described. Throughout § 4.2, examples which illustrate operations and intermediate data structures of exemplary embodiments of the present invention are provided. Finally, concluding remarks about the present invention are presented in § 4.3.

§ 4.1 FUNCTIONS OF THE PRESENT INVENTION

The present invention functions to increase the resolution of text rendered on a display device having sub-pixel elements, such as an RGB LCD for example, and in particular, on a display device having horizontal striping. The present invention may do so by (i) overscaling (or oversampling) character outline information in the vertical (or Y) direction, and (ii) filtering (e.g., averaging) displaced (either overlapping, immediately adjacent, or spaced) scan conversion source samples from the overscaled (or oversampled) character outline information.

The present invention may also function to appropriately adjust metrics associated with the character outline information (such as left side bearing, advance width, vertical character size, ascent, descent, etc.).

The present invention may also function to constrain the vertical (or Y) position of the baseline of adjacent characters by forcing the first pixel above the baseline to be composed of a full number N of scan conversion source samples, where N corresponds to an overscaling (or oversampling) factor.

The present invention may also function to convert groups of scan conversion source samples into packed pixel index values. Although, in the following, the scan conversion process is described as operating on "scan conversion source samples", the scan conversion process, as well as the overscaling (or oversampling) and hinting processes may be analog operations operating on analog information rather than discrete samples.

The present invention may also function to selectively filter color values when the differences in the intensity of adjacent sub-pixel elements would otherwise be irritating to view.

Finally, the present invention may function to correct the gamma of the pixel values so that the gamma of the display device is considered and so that intensity values of sub-pixel elements fall within a range of intensities in which gamma correction is more useful.

§ 4.2 EXEMPLARY APPARATUS, PROCESSESS, METHODS, AND DATA STRUCTURES FOR PERFORMING VARIOUS ASPECTS OF THE PRESENT INVENTION

Exemplary methods, apparatus and data structures which may be used to effect various aspects of the present invention are described in the context of a system for improving the readability of text on flat panel screens having horizontal striping (also referred to as "text enhancement system"). An overview of this system is presented in § 4.2.2 below. Before that, however, exemplary apparatus which may be used to effect at least some aspects of the present invention, as well as the text enhancement system, are described in § 4.2.1 below.

§ 4.2.1 EXEMPLARY APPARATUS

Figure 5A:
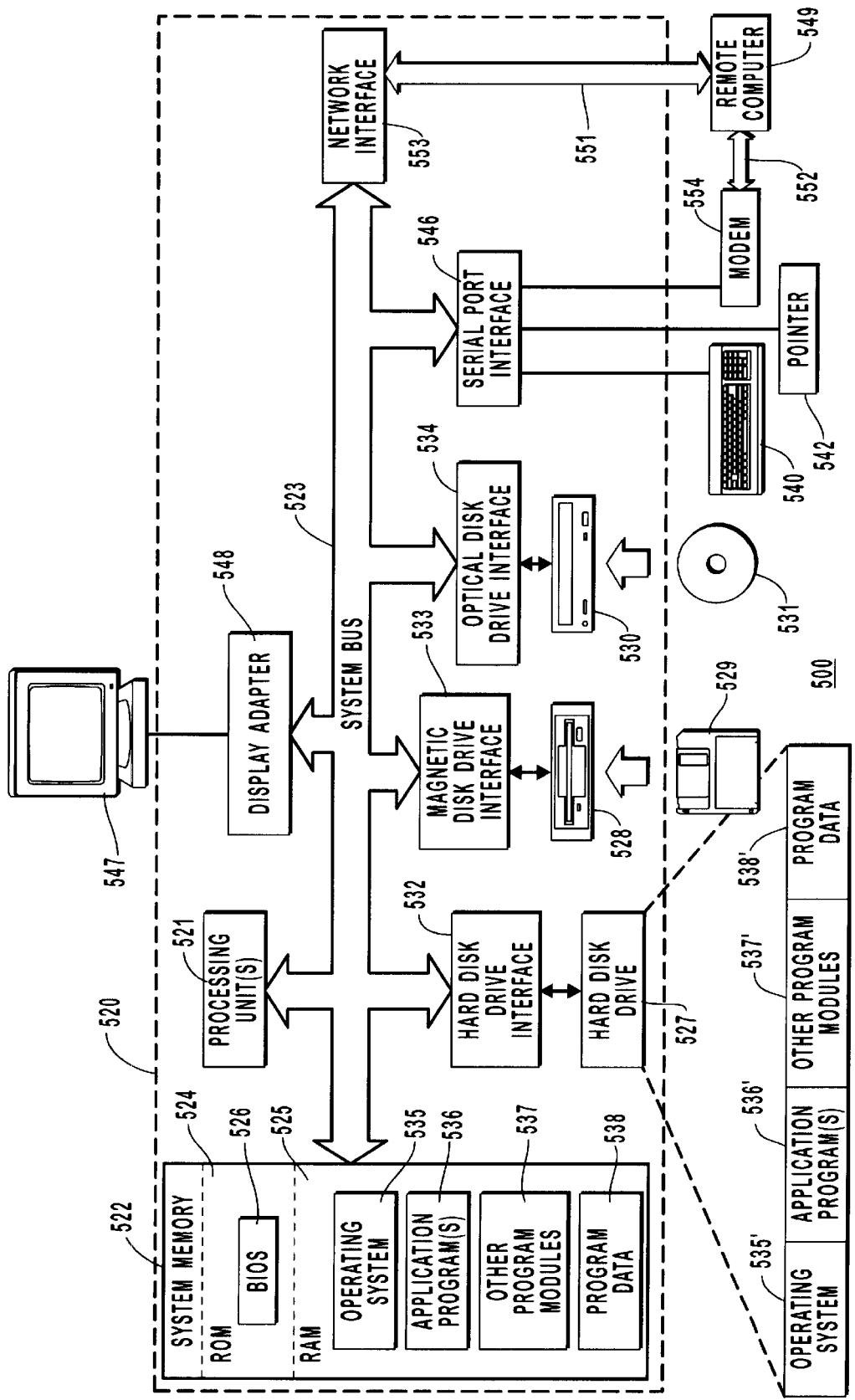
FIG. 5A is a block diagram of a computer system which may be used to implement at least certain aspects of the present invention.

FIG. 5A and the following discussion provide a brief, general description of an exemplary apparatus in which at least some aspects of the present invention may be implemented. Various methods of the present invention will be described in the general context of computer-executable instructions, such as program modules and/or routines for example, being executed by a computing device such as a personal computer. Other aspects of the invention will be described in terms of physical hardware such as display device components and display screens for example.

Naturally, the methods of the present invention may be effected by apparatus other than those described. Program modules may include routines, programs, objects, components, data structures (e.g., look-up tables, etc.) that perform task(s) or implement particular abstract data types. Moreover, those skilled in the art will appreciate that at least some aspects of the present invention may be practiced with other configurations, including hand held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules may be located in local and/or remote memory storage devices.

FIG. 5A is a block diagram of an exemplary apparatus 500 which may be used to implement at least some aspects of the present invention. A personal computer 520 may include a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system 522 memory may include read only memory (ROM) 524 and/or random access memory (RAM) 525. A basic input/output system 526 (BIOS), including basic routines that help to transfer information between elements within the personal computer 520, such as during start-up, may be stored in ROM 524. The personal computer 520 may also include a hard disk drive 527 for reading from and writing to a hard disk, (not shown), a magnetic disk drive 528 for reading from or writing to a (e.g., removable) magnetic disk 529, and an optical disk drive 530 for reading from or writing to a removable (magneto) optical disk 531 such as a compact disk or other (magneto) optical media. The hard disk drive 527, magnetic disk drive 528, and (magneto) optical disk drive 530 may be coupled with the system bus 523 by a hard disk drive interface 532, a magnetic disk drive interface 533, and a (magneto) optical drive interface 534, respectively. The drives and their associated storage media provide nonvolatile storage of machine readable instructions, data structures, program modules and other data for the personal computer 520. Although the exemplary environment described herein employs a hard disk, a removable magnetic disk 529 and a removable optical disk 531, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 523, magnetic disk 529, (magneto) optical disk 531, ROM 524 or RAM 525, such as an operating system 535, one or more application programs 536, other program modules 537, display driver 732 (described in § 4.2.2.2 below), and/or program data 538 for example. The RAM 525 can also be used for storing data used in rendering images for display as will be discussed below. A user may enter commands and information into the personal computer 520 through input devices, such as a keyboard 540 and pointing device 542 for example. Other input devices (not shown) such as a microphone, joystick, game pad, satellite dish, scanner, or the like may also be included. These and other input devices are often connected to the processing unit 521 through a serial port interface 546 coupled to the system bus. However, input devices may be connected by other interfaces, such as a parallel port, a game port or a universal serial bus (USB). A monitor 547 or other type of display device may also be connected to the system bus 523 via an interface, such as a display adapter 548, for example. In addition to the monitor 547, the personal computer 520 may include other peripheral output devices (not shown), such as speakers and printers for example.

The personal computer 520 may operate in a networked environment which defines logical connections to one or more remote computers, such as a remote computer 549. The remote computer 549 may be another personal computer, a server, a router, a network PC, a peer device or other common network node, and may include many or all of the elements described above relative to the personal computer 520. The logical connections depicted in FIG. 5A include a local area network (LAN) 551 and a wide area network (WAN) 552 (such as an intranet and the Internet for example).

When used in a LAN, the personal computer 520 may be connected to the LAN 551 through a network interface adapter card (or "NIC") 553. When used in a WAN, such as the Internet, the personal computer 520 may include a modem 554 or other means for establishing communications over the wide area network 552. The modem 554, which may be internal or external, may be connected to the system bus 523 via the serial port interface 546. In a networked environment, at least some of the program modules depicted relative to the personal computer 520 may be stored in the remote memory storage device. The network connections shown are exemplary and other means of establishing a communications link between the computers may be used.

Figure 5B:
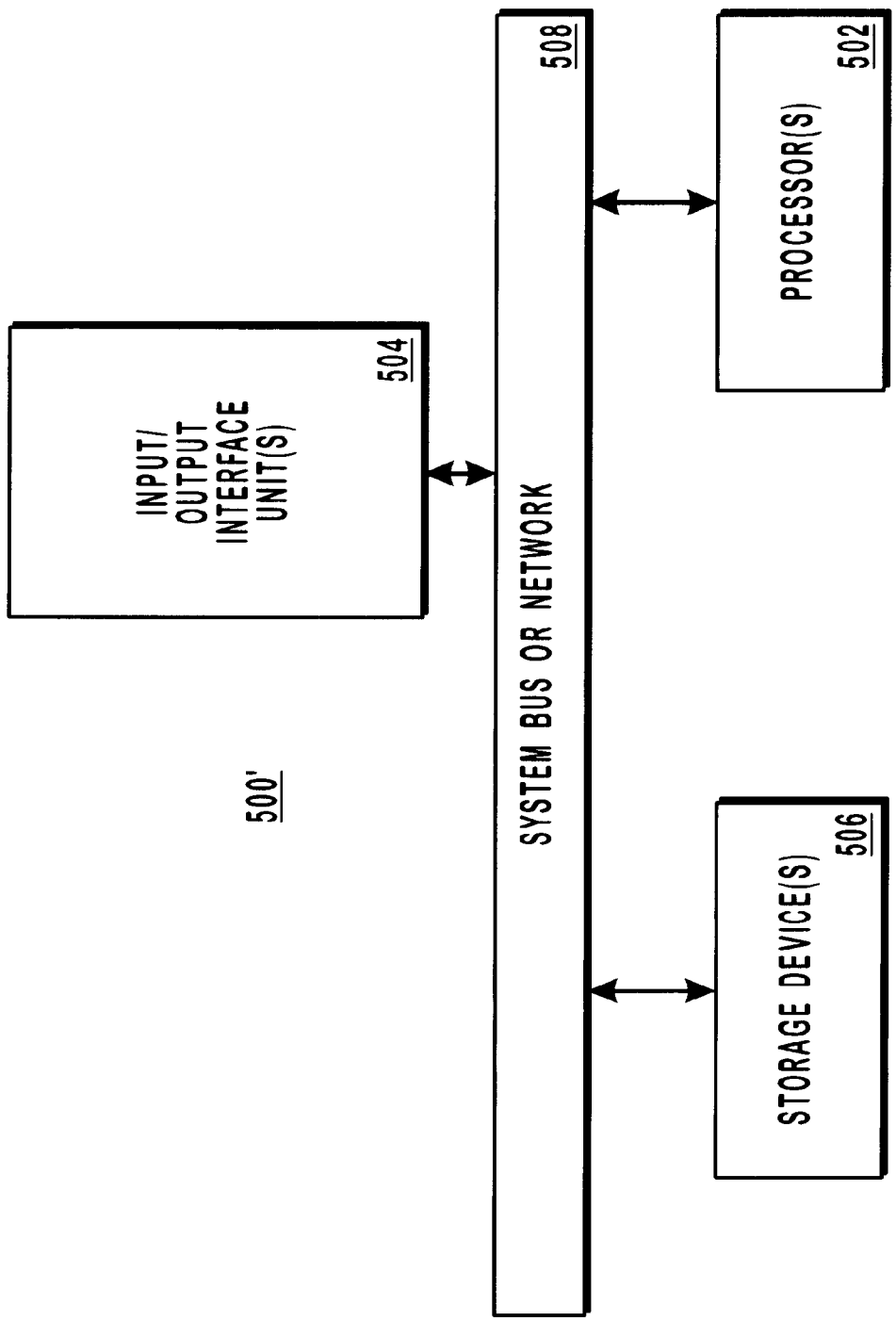
FIG. 5B is a high level block diagram of a machine which may be used to implement at least certain aspects of the present invention.

FIG. 5B is a more general machine 500' which may effect at least some aspects of the present invention. The machine 500' basically includes a processor(s) 502, an input/output interface unit(s) 504, a storage device(s) 506, and a system bus or network 508 for facilitating data and control communications among the coupled elements. The processor(s) 502 may execute machine-executable instructions to effect one or more aspects of the present invention. At least a portion of the machine executable instructions and data structures may be stored (temporarily or more permanently) on the storage devices 506 and/or may be received from an external source via an input interface unit 504.

Having described exemplary apparatus which may be used to effect at least some aspects of the present invention, an overview of the text enhancement system is now presented in § 4.2.2 below.

§ 4.2.2 TEXT ENHANCEMENT SYSTEM

Figure 3:
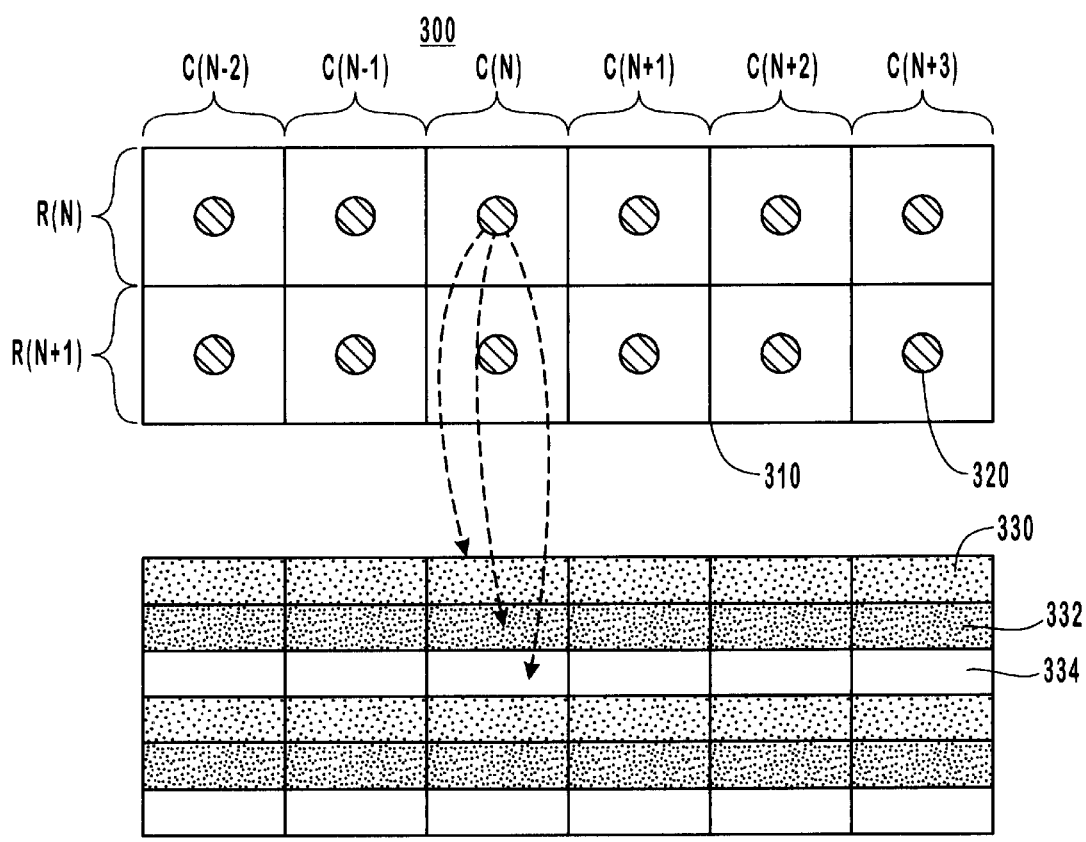
FIG. 3 illustrates a known image sampling operation.

Recall from FIG. 3, described in § 1.2.2 above, that most conventional systems treat pixels as individual units into which a corresponding portion of an image can be mapped. Accordingly, in the case of conventional systems, the same portion of an image, e.g., a pixel element sized portion, is used to determine the luminous intensity values to be used with each of the RGB sub-pixel elements of a pixel element into which a portion of the scaled image is mapped.

In the case of scaling fonts, the font unit coordinates used to define the position of points defining contours of a character outline were scaled to device specific pixel coordinates. That is, when the resolution of the em square is used to define a character outline, before that character can be displayed, it must be scaled to reflect the size, transformation and the characteristics of the output device on which it is to be rendered. The scaled outline describes the character outline in units that reflect the absolute unit of measurement used to measure pixels of the output device, rather than the relative system of measurement of font units per em. Specifically, in the past, values in the em square were converted to values in the pixel coordinate system in accordance with the following formula:

$$\text{size in pixels} = \frac{\text{character outline size} \cdot \text{point size} \cdot \text{output device resolution}}{72 \text{ points per inch} \cdot \text{number of font units per em}} \quad (1)$$

where character size is in font units, and output device resolution is in pixels/inch.

The resolution of the output device may be specified by the number of dots or pixels per inch (dpi). For example, a VGA video monitor may be treated as a 96 dpi device, a laser printer may be treated as a 300 dpi device, an EGA video monitor may be treated as a 96 dpi device in the horizontal (X) direction, but a 72 dpi device in the vertical (Y) direction. The font units per em may (but need not) be chosen to be a power of two (2), such as 2048 (=$2^{11}$) for example.

In the text enhancement system of the present invention, the image is overscaled or oversampled, and in particular, may be overscaled or oversampled in the vertical (or Y) direction. The RGB sub-pixel elements of a pixel are treated as independent luminous intensity elements into which a different portion of the overscaled or oversampled image can be mapped. This overscaling or oversampling operation is described in more detail in § 4.2.2.1.1.1 below.

Figure 7:
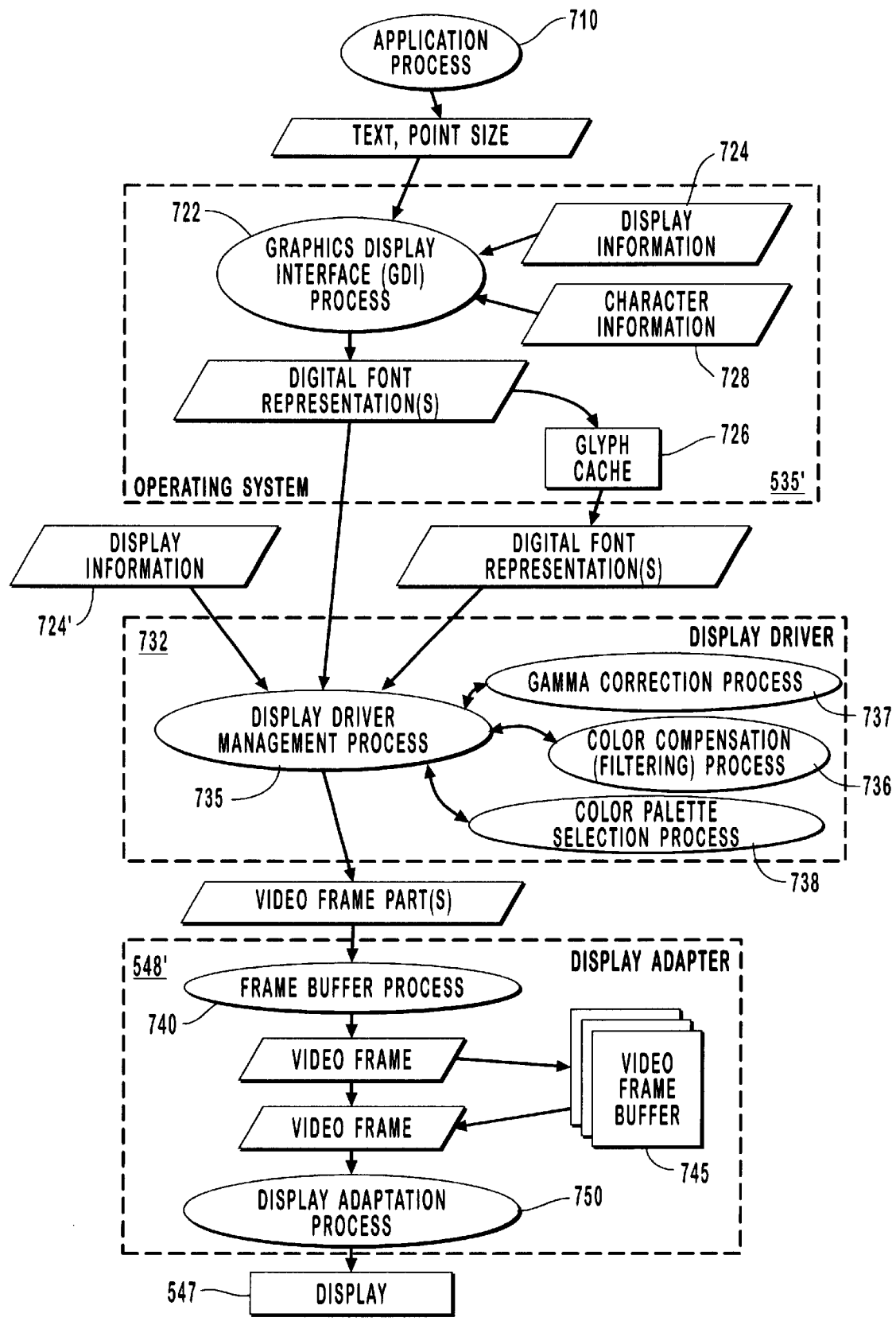
FIG. 7 is a diagram of high level processes of an environment in which at least certain aspects of the present invention may operate.

FIG. 7 is a high level diagram of processes which may be performed by the text enhancement system. As shown in FIG. 7, an application process 710, such as a word processor or contact manager for example, may request that text be displayed and may specify a point size for the text. Although not shown in FIG. 7, the application process 710 may also request a font name, background and foreground colors and a screen location at which the text is to be rendered. The text and, if applicable, the point size, are provided to a graphics display interface (or GDI) process (or more generally, a graphics display interface) 722. The GDI process 722 uses display information 724 (which may include such display resolution information as pixels per inch on the display) and character information 728 (which may be a character outline information which may be represented as points defining a sequence of contours such as lines and curves, advance width information and left side bearing information) to generate glyphs (or to access cached glyphs which have already been generated). Glyphs may include a bitmap of a scaled character outline (or a bounding box 408 containing black body 407 information), advance width 402 information, and left side bearing 410 information. Each of the bits of the bitmap may have associated red, green and blue luminous intensity values. As will be described below, these values may be combined into a single, 8-bit for example, value which may be referred to as a "packed pixel value." The graphics display interface process 722 is described in more detail in § 4.2.2.1 below. The graphics display interface process 722, the display information 724, and the glyph cache 726 may be a part of, and effected by, an operating system 535', such as the Windows® CE or Windows NT® operating systems (from Microsoft Corporation of Redmond, Wash.) for example.

Glyphs, either from the glyph cache 726 or from the graphics display interface process 722, are then provided to a display driver management process (or more generally, a display driver manager) 735. The display driver management process 735 may be a part of a display (or video) driver 732. Typically, a display driver 732 may be software which permits a computer operating system to communicate with a particular video display. Basically, the display driver management process 735 may invoke a color compensation (or color filtering) process 736, a gamma correction process 737 and a color palette selection process 738. These processes 735, 736, 737, 738 serve to convert the character glyph information into the actual RGB pixel sub-component luminous intensity values. One or more of the processes 736, 737, 738 may be effected by a set of pre-computed look-up tables which may be used to perform a plurality of image processing operations. The display driver management process 735 receives, as input, glyphs and display information 724'. The display information 724' may include, for example, foreground/background color information, a gamma value of the display device 547, color palette information and pixel value format information. The display information 724' may be used to select one of the look-up tables included in the set of look up tables to be used.

The processes which may be performed in the display driver are described in more detail in § 4.2.2.2 below.

The processed pixel values may then be forwarded as video frame part(s) along with screen (and perhaps window) positioning information (e.g., from the application process 710 and/or operating system 535'), to a display (video) adapter 548'. A display adapter 548' may include electronic components that generate a video signal sent to the display 547. A frame buffer process 740 may be used to store the received video frame part(s) in a screen frame buffer 745 of the display adapter 548. Using the screen frame buffer 745 allows a single image of, e.g., a text string, to be generated from glyphs representing several different characters. The video frame(s) from the screen frame buffer 745 is then provided to a display adaptation process 750 which adapts the video for a particular display device. The display adaptation process 750 may also be effected by the display adapter 548'.

Finally, the adapted video is presented to the display device 547, such as an LCD display for example, for rendering.

Having provided an overview of a text enhancement system, the graphics display interface process 722 is now described in more detail in § 4.2.2.1 below. The processes which may be performed by the display driver are then described in more detail in § 4.2.2.2 below.

§ 4.2.2.1 GRAPHICS DISPLAY INTERFACE

Figure 8:
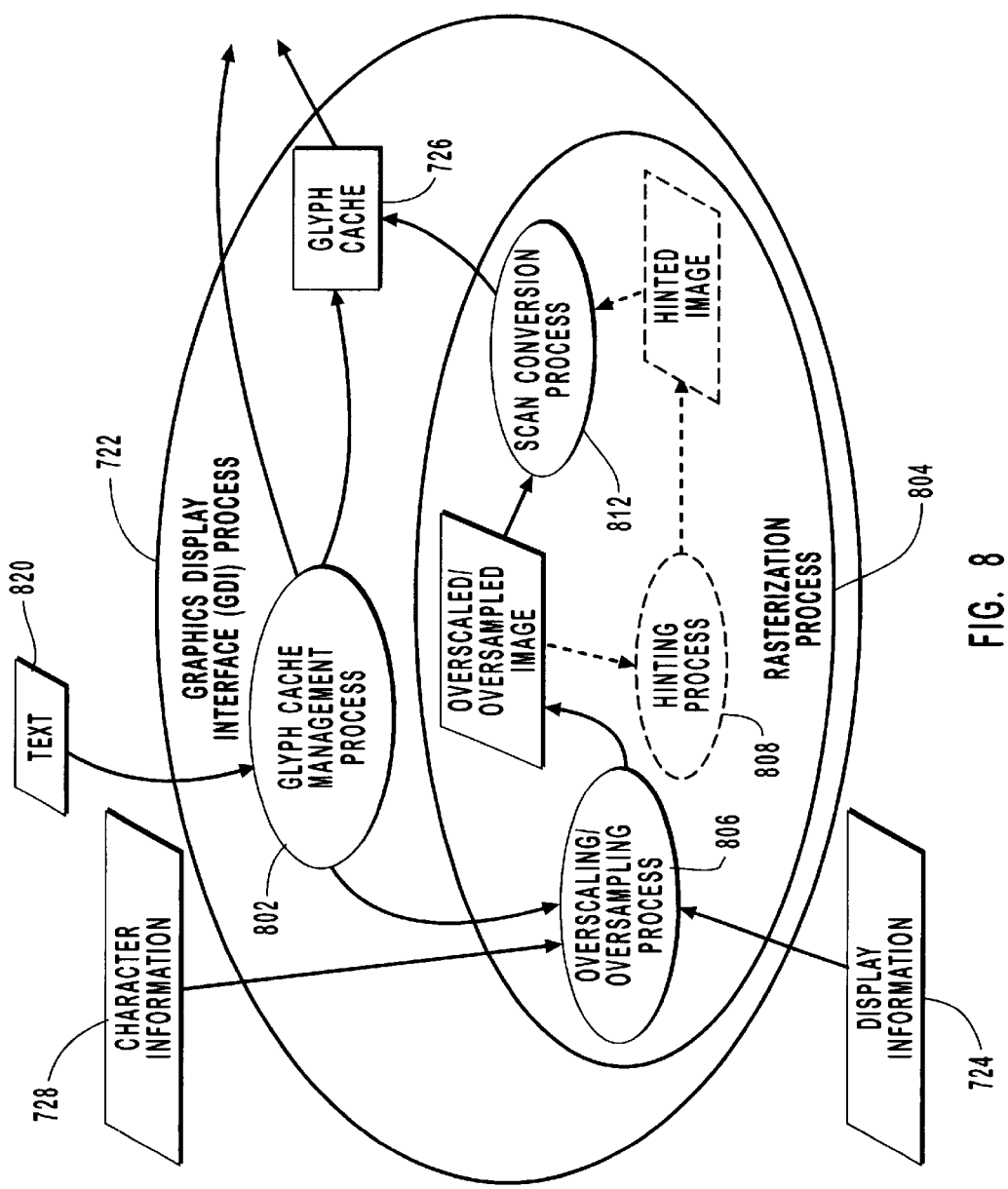
FIG. 8 is a diagram of graphics display interface processes of an environment in which at least certain aspects of the present invention may operate.

FIG. 8 illustrates processes that may be performed by a graphics display interface (or GDI) process 722, as well as data that may be used by the GDI process 722. As shown in FIG. 8, the GDI process 722 may include a glyph cache management process (or more generally, a glyph cache manager) 802 which accepts text, or more specifically, requests to display text, 820. The request may include the point size of the text. The glyph cache management process 802 forwards this request to the glyph cache 726. If the glyph cache 726 includes the glyph corresponding to the requested text character, it provides it for downstream processing. If, on the other hand, the glyph cache 726 does not have the glyph corresponding to the requested text character, it so informs the glyph cache management process 802 which, in turn, submits a request to generate the needed glyph to the type rasterization process (or more generally, a type rasterizer) 804. Basically, a type rasterization process 804 may be effected by hardware and/or software and converts a character outline (which may, recall include points which define contours such as lines and curves based on mathematical formulas) into a raster (that is, a bitmapped) image. Each pixel of the bitmap image may have a color value and a brightness for example. A type rasterization process is described in § 4.2.2.1.1 below.

§ 4.2.2.1.1 RASTERIZER

To reiterate, the type rasterization process 804 basically transforms character outlines into bitmapped images. The scale of the bitmap may be based on the point size of the font and the resolution (e.g., pixels per inch) of the display device 547. The text, font, and point size information may be obtained from the application 710, while the resolution of the display device 547 may be obtained from a system configuration or display driver file or from monitor settings stored in memory 522 by the operating system 535. The display information 724 may also include foreground/background color information, gamma values, color palette information and/or display adapter/display device pixel value format information. To reiterate, this information may be provided from the graphics display interface 722 in response to a request from the application process 710. If, however, the background of the text requested is to be transparent (as opposed to Opaque), the background color information is what is being rendered on the display (such as a bitmap image or other text for example) and is provided from the display device 547 or the video frame buffer 745.

Basically, the rasterization process may include two (2) or three (3) sub-steps or sub-processes. First, the character outline is overscaled (or oversampled) using an overscaling/oversampling process 806. This process is described in § 4.2.2.1.1.1 below. Next, the overscaled/oversampled image generated by the overscaling/oversampling process 806 may be placed on a grid and have portions extended or shrunk using a hinting process 808. This process is described in § 4.2.2.1.1.2 below. Then, displaced (e.g., immediately adjacent, overlapping, or spaced) samples of scan conversion source samples of the overscaled/oversampled (and optionally hinted) image are combined (e.g., filtered, averaged, etc.) by a scan conversion process 812 to generate values corresponding to the sub-pixel elements 210, 220, 230 of the display 547. The scan conversion process 812 is described in § 4.2.2.1.1.3 below. The resulting data stored in the glyph cache 726 is described in § 4.2.2.1.1.4 below.

§ 4.2.2.1.1.1 SCALING/OVERSAMPLING

Recall from § 4.2.2 above, that when scaling fonts in conventional systems such as TrueType™ from Microsoft Corporation of Redmond, Wash., the font unit coordinates used to define the position of points defining contours of a character outline were scaled to device specific pixel coordinates. That is, since the resolution of the em square was used to define a character outline, before that character could be displayed, it was scaled to reflect the size, transformation and the characteristics of the output device on which it was to be rendered. Recall that the scaled outline describes the character outline in units that reflect the absolute unit of measurement used to measure pixels of the output device, rather than the relative system of measurement of font units per em. Thus, recall that values in the em square were converted to values in the pixel coordinate system in accordance with the following formula:

$$\text{size in pixels} = \frac{\text{character outline size} \cdot \text{point size} \cdot \text{output device resolution}}{72 \text{ points per inch} \cdot \text{number of font units per em}} \quad (1)$$

where character size is in font units, and output device resolution is in pixels/inch.

Recall that the resolution of an output device may be specified by the number of dots or pixels per inch (dpi).

With the foregoing background in mind, in the text enhancement system of the present invention, the image is overscaled or oversampled, and in particular, may be overscaled or oversampled in the vertical (or Y) direction. The RGB pixel sub-components of a pixel are treated as independent luminous intensity elements into which a different portion of the overscaled or oversampled image can be mapped. Thus, a higher degree of resolution than is possible with the known scan conversion techniques is provided. Accordingly, equation (1) discussed above may be modified to read:

$$\text{size in pixels} = \frac{N \cdot \text{character outline size} \cdot \text{point size} \cdot \text{output device resolution}}{72 \text{ points per inch} \cdot \text{number of font units per em}} \quad (2)$$

where character size is in font units, output device resolution is in pixels/inch, and where N is an overscaling or oversampling factor.

In the case of RGB horizontally striped display devices, the overscaling or oversampling factor may be zero (0) in the X direction and three (3) in the Y direction. Such overscaling or oversampling factors would scale the character outline from font units to sub-pixel elements (Recall 210, 220, 230 of FIG. 2.) In practice, it may be useful to further overscale or oversample. In this way, a number of scan conversion source samples may be used to derive the value of each sub-pixel component. For example, if the overscaling or oversampling factor is nine (9) in the Y direction, three (3) scan conversion source samples may be used (e.g., via an averaging operation) to define the intensity of a red sub-pixel element of a pixel, another three (3) scan conversion source samples may be used to define the intensity of a green sub-pixel element of the pixel, and the final three (3) scan conversion source samples may be used to define the intensity of a blue sub-pixel element of the pixel. Alternative sampling and filtering techniques are possible. For example, the samples may be weighted such that more scan conversion source samples are used to define the green sub-pixel element and less scan conversion source samples are used to define the blue sub-pixel element. In one embodiment, the red sub-pixel element is allocated a weight of five (5) and is derived from five (5) scan conversion source samples, the green sub-pixel element is allocated a weight of nine (9) and is derived from nine (9) scan conversion source samples, and the blue sub-pixel element is allocated a weight of two (2) and is derived from two (2) scan conversion source samples, and overscaling (or oversampling) is performed at a rate of one (1) time in the X direction and sixteen (16) times in the Y direction. This is referred to as "weighted sampling". The samples may include some overlapping scan conversion source samples such that some scan conversion source sample(s) may be used to determine more than one sub-pixel element. Alternatively, some scan conversion source sample(s) may be ignored. Similarly, alternative filtering techniques to averaging may be used.

Figure 6:
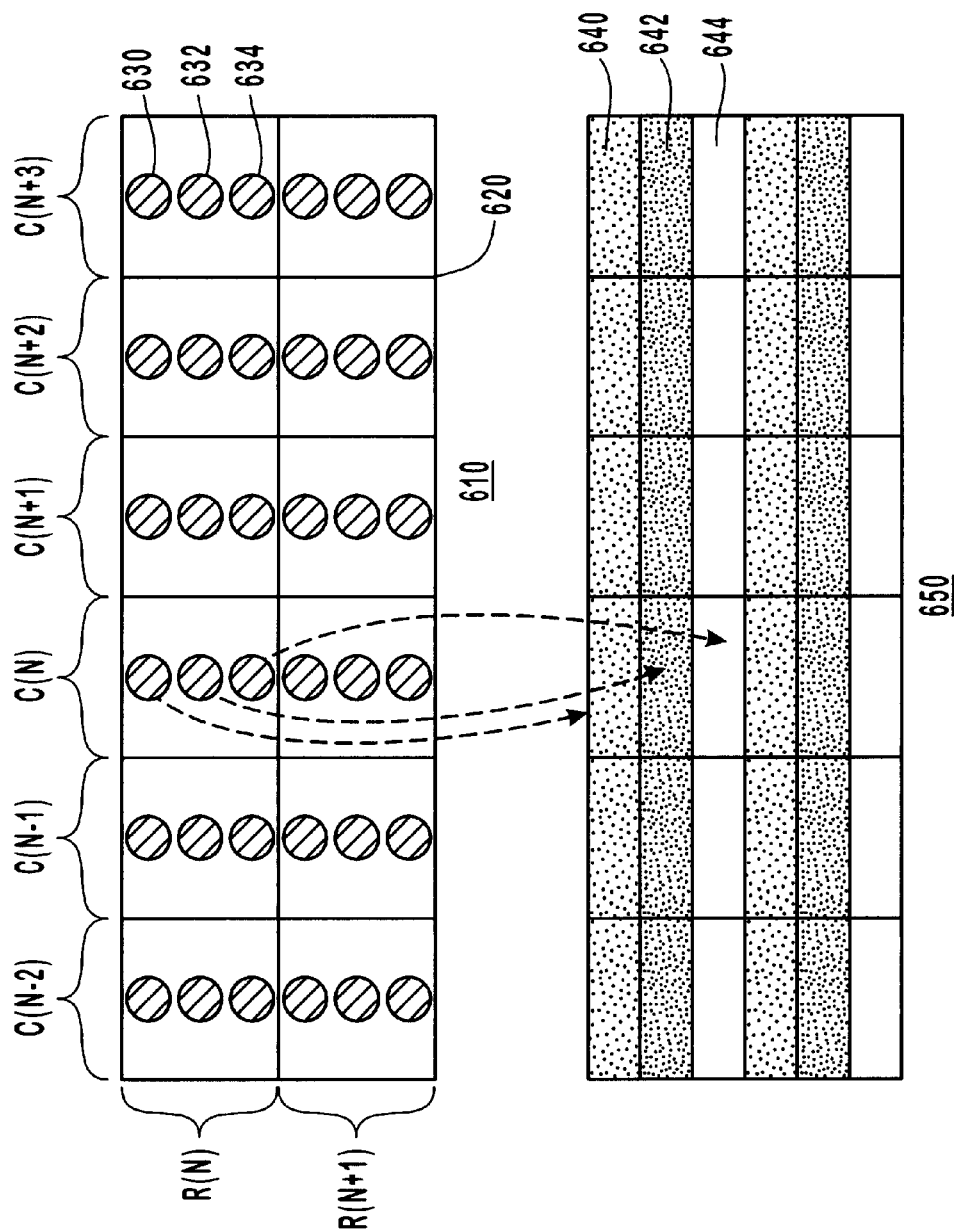
FIG. 6 illustrates an image sampling technique with which the present invention may be used.

FIG. 6 illustrates an exemplary scan conversion operation implemented in accordance with an exemplary text enhancement system. In the illustrated embodiment, different image samples 630, 632, 634 of the image 610 segmented by the grid 620 are used to generate the red, green and blue intensity values associated with corresponding portions 640, 642, 644 of the bitmap image 650 being generated. In the example illustrated in FIG. 6, image samples for red and blue are displaced −⅓ and +⅓ of a pixel width in distance from the green sample, respectively. Thus, the placement errors introduced when rounding to pixel precision described in § 1.2.2.1.2, encountered with the known sampling/image representation method illustrated in FIG. 3, are decreased to such an extent that any remaining placement errors are barely, if at all, perceptible. Such techniques for increasing font resolution are described in U.S. patent application Ser. No. 09/168,013 filed on Oct. 7, 1998 and entitled "METHODS AND APPARATUS FOR RESOLVING EDGES WITHIN A DISPLAY PIXEL," U.S. patent application Ser. No. 09/168,015 filed on Oct. 7, 1998 and entitled "METHODS AND APPARATUS FOR PERFORMING GRID FITTING AND HINTING OPERATIONS," U.S. patent application Ser. No. 09/168,014 filed on Oct. 7, 1998 and entitled "METHODS AND APPARATUS FOR PERFORMING IMAGE RENDERING AND RASTERIZATION OPERATIONS," U.S. patent application Ser. No. 09/168,012 filed on Oct. 7, 1998 and entitled "METHODS AND APPARATUS FOR PERFORMING IMAGE RENDERING AND RASTERIZATION OPERATIONS," U.S. patent application Ser. No. 09/191,173 filed on Nov. 13, 1998 and entitled "METHODS AND APPARATUS FOR DETECTING AND REDUCING COLOR ARTIFACTS IN IMAGES," U.S. patent application Ser. No. 09/191,181 filed on Nov. 13, 1998 and entitled "GRAY SCALE AND COLOR DISPLAY METHODS AND APPARATUS," U.S. patent application Ser. No. 09/273,105 filed on Mar. 19, 1999 and entitled "METHODS AND APPARATUS FOR POSITIONING DISPLAYED CHARACTERS," U.S. patent application Ser. No. 09/273,147 filed on Mar. 19, 1999 and entitled "METHODS AND APPARATUS FOR REPRESENTING MULTIPLE LUMINANCE INTENSITY VALUES AS A SINGLE VALUE," U.S. patent application Ser. No. 09/273,302 filed on Mar. 19, 1999 and entitled "METHODS AND APPARATUS FOR GENERATING AND REPRESENTING LUMINANCE INTENSITY VALUES," and U.S. patent application Ser. No. 09/272,412 filed on Mar. 19, 1999 and entitled "METHODS AND APPARATUS FOR EFFICIENTLY IMPLEMENTING AND MODIFYING FOREGROUND AND BACKGROUND COLOR SELECTIONS," each of which applications is expressly incorporated herein by reference. To obtain sub-pixel resolution, the rasterized character, i.e., the bitmap produced by the rasterization process is overscaled and/or oversampled, typically in the direction perpendicular to the striping of the display device. Oversampling can be thought of as compressing the grid of samples while maintaining the image on which the grid is laid. On the other hand, overscaling can be thought of as maintaining the grid of samples while stretching the image on which the grid is laid.

Figure 1:
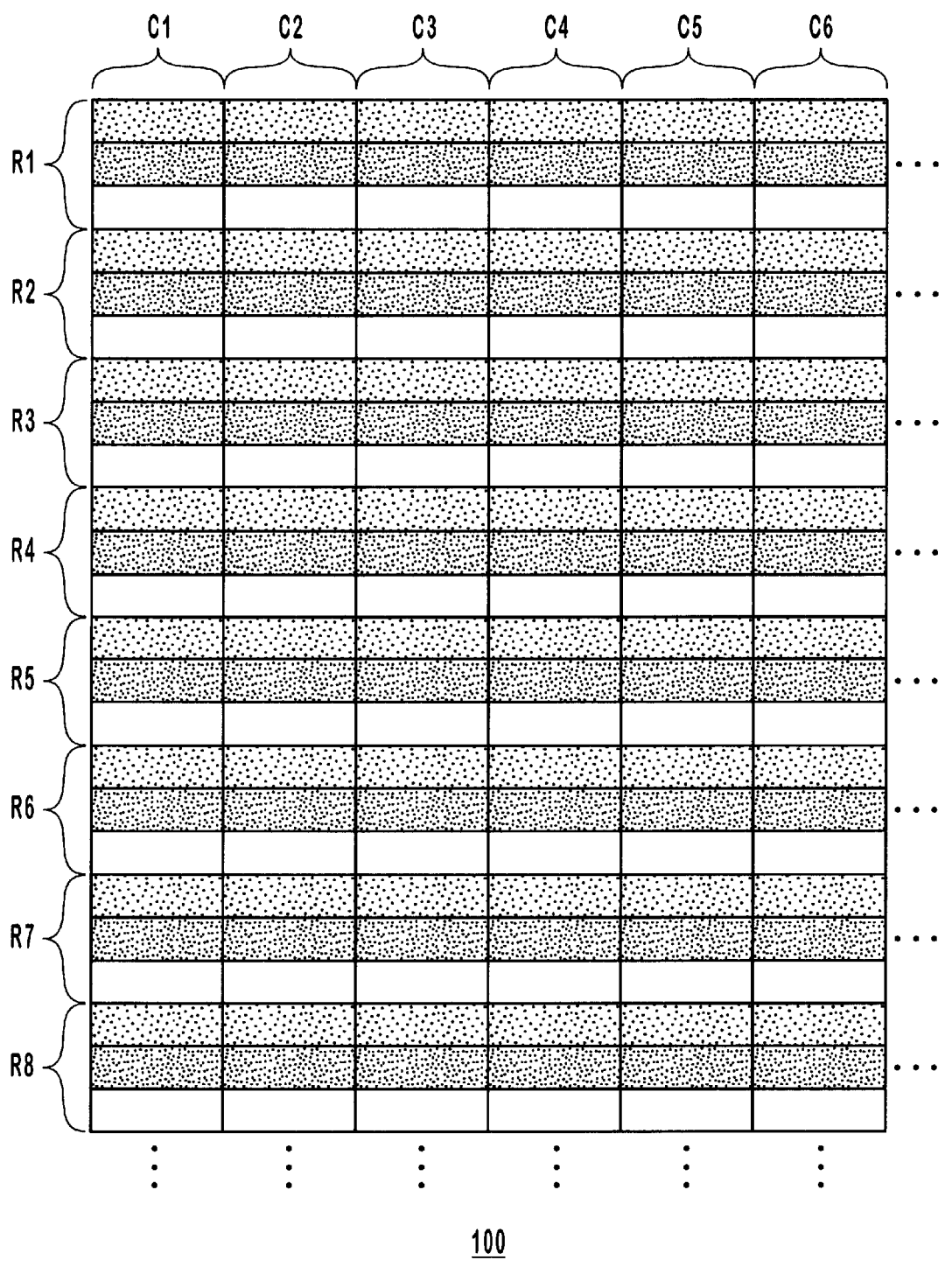

In general, the overscaling (or oversampling) process 806 may perform a non-square scaling (or sampling) based on the direction and/or number of sub-pixel elements included in each pixel element. In particular, the high resolution character information 728 (Recall that this information may include contours defined by a sequence of points which define lines and curves.) may be overscaled (or oversampled) in the direction perpendicular to the striping at a greater rate than in the direction of the striping. Thus, for example, when vertically striped displays are used as the device upon which data is to be displayed, scaling is performed in the horizontal (or X) direction at a rate that is greater than that performed in the vertical direction. On the other hand, when horizontally striped displays of the type illustrated in FIG. 1 are used as the device upon which data is to be displayed, scaling is performed in the vertical (or Y) direction at a rate that is greater than that performed in the horizontal direction. Such uneven scaling allows subsequent image processing operations to exploit the higher degree of resolution that can be achieved by using individual sub-pixel elements as independent luminous intensity sources in accordance with the present invention. Thus, in most cases, the overscaling (or oversampling) of characters or images is, but need not be, performed in the direction perpendicular to the striping at a rate which allows further dividing of the red, green and blue stripes to thereby support a subsequent scan conversion operation.

A first overscaling (or oversampling) technique will now be described with reference to FIGS. 10 and 11, while a second overscaling (or oversampling) technique will be described with reference to FIGS. 12 and 13.

Figure 10:
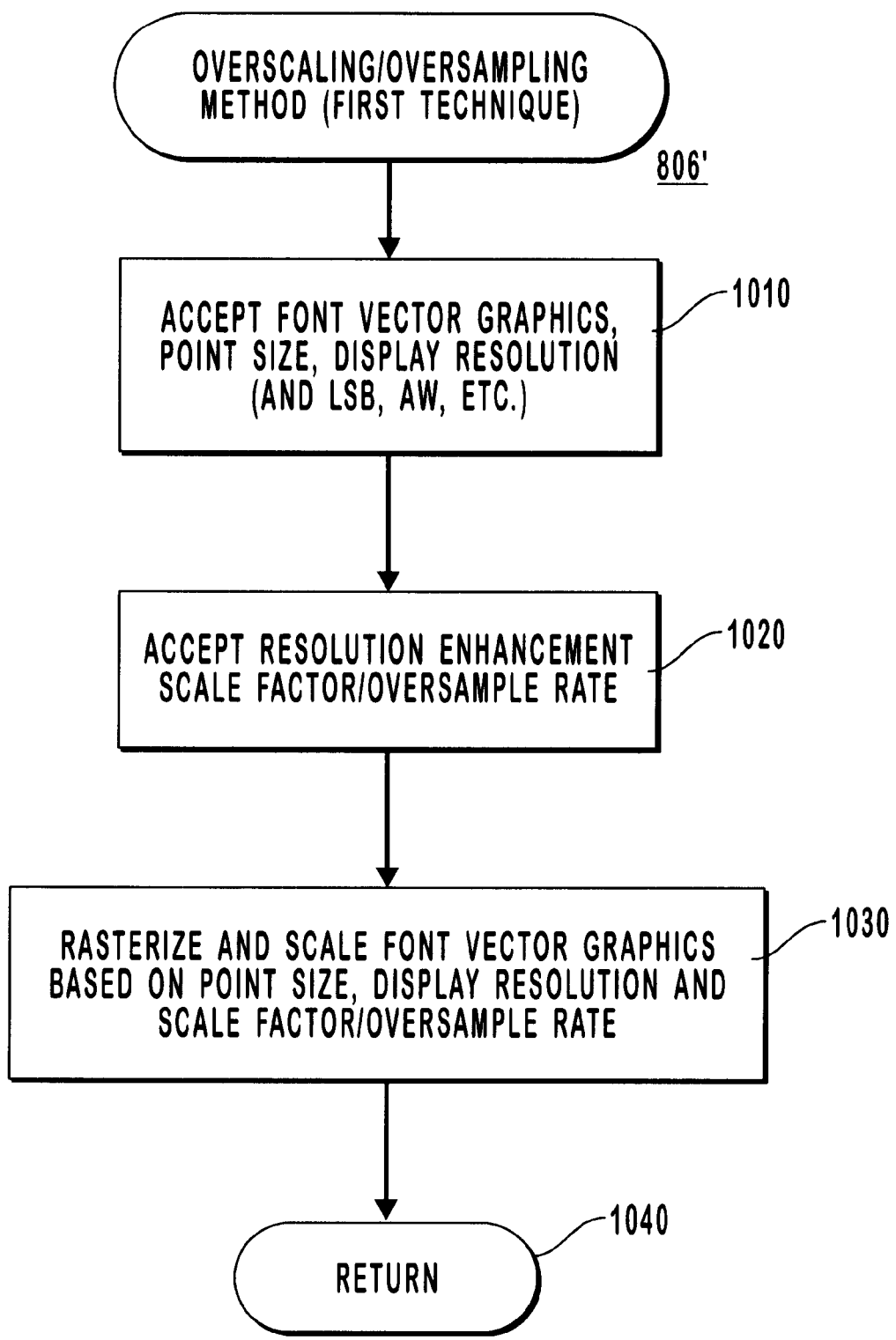
FIG. 10 is a high level flow diagram of a first method for effecting an overscaling or oversampling process.
Figure 11:
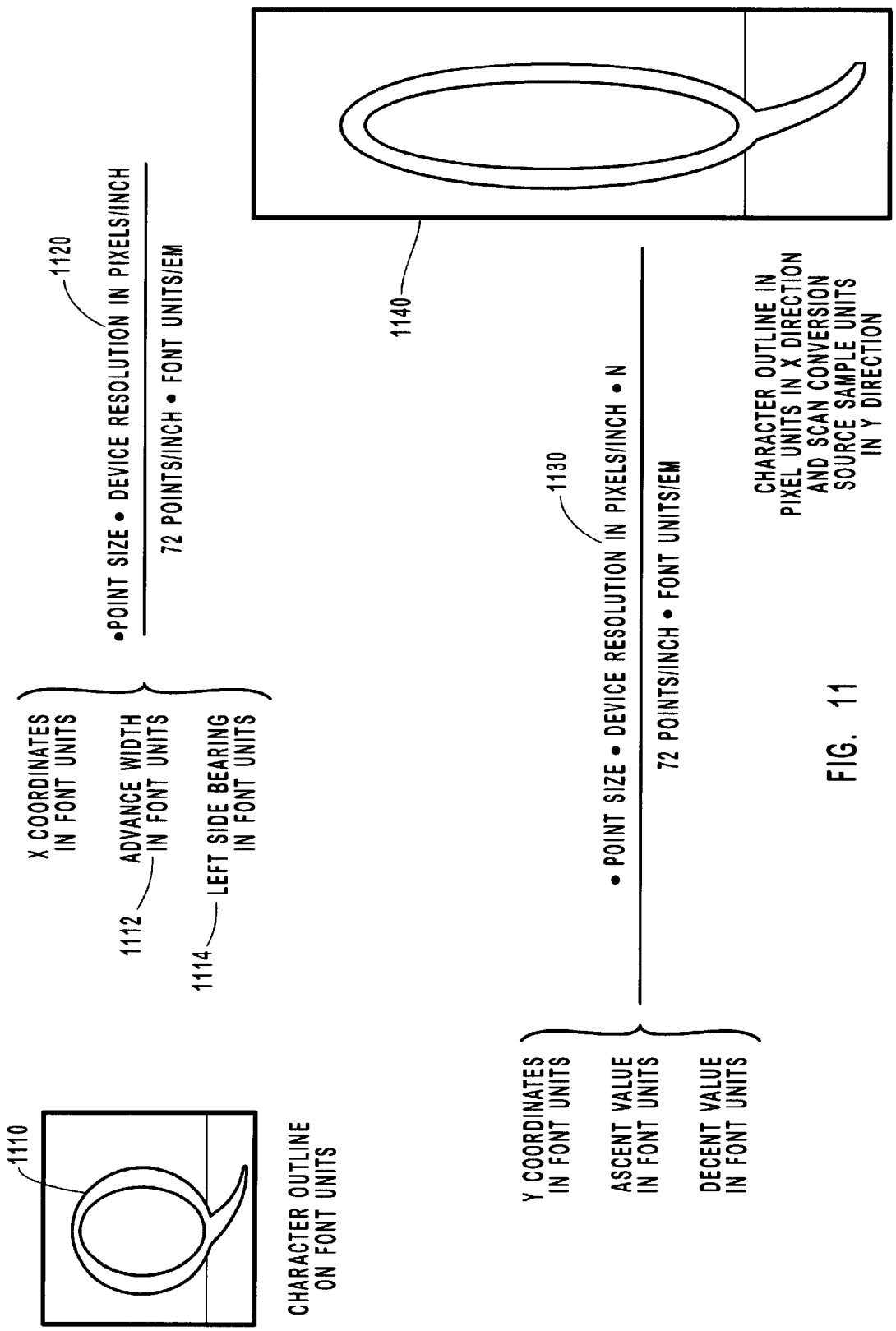
FIG. 11 is an example which illustrates the operation of the method depicted in FIG. 10.

FIG. 10 is a high level flow diagram of a first method 806' for effecting the overscaling (or oversampling) process 806. FIG. 11 illustrates an example of the operation of the method 806' of FIG. 10. First, as shown in step 1010, the font vector graphics (e.g., the character outline), point size and display resolution are accepted. This information is denoted 1110 in FIG. 11. Font metrics such as the left side bearing (Recall 410.), advance width (Recall 402.), ascent (Recall 942.) and descent (Recall 944.) may also be accepted. This information is denoted 1112 and 1114 in FIG. 11. As shown in step 1020, the overscale factor or oversample rate (Recall N of Equation 2.) is accepted. Then, as shown in step 1030, the font vector graphics (e.g., the character outline) 1110 is rasterized based on the point size, display resolution and the overscale factors (or oversample rate). As shown in the example of FIG. 11, the X coordinate values of the character outline (in units of font units), as well as the advance width and left side bearing (also in units of font units) are scaled as shown in 1120 (Recall Equation 1.) and rounded to the nearest integer pixel value. On the other hand, the Y coordinate values of the character outline (in units of font units), as well as ascent, descent, and other vertical font feature values (also in units of font units) are overscaled as shown in 1130 (Recall Equation 2.) and rounded to the nearest integer scan conversion source sample value. The resulting data 1140 is the character outline in units of pixels in the X direction and units of scan conversion source samples in the Y direction. The method 806' is then left via RETURN node 1040.

Figure 12:
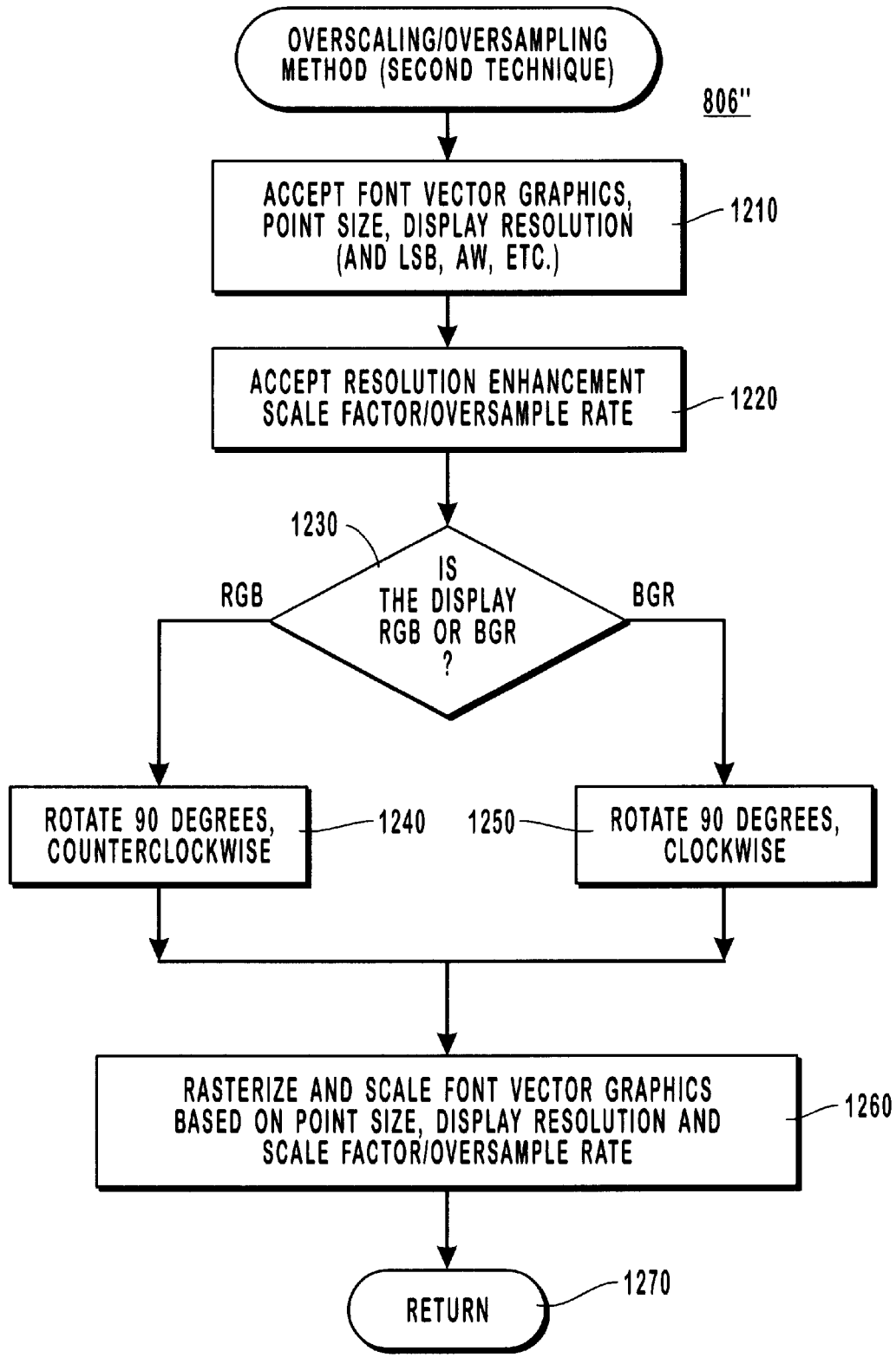
FIG. 12 is a high level flow diagram of a second method for effecting an overscaling or oversampling process.
Figure 13:
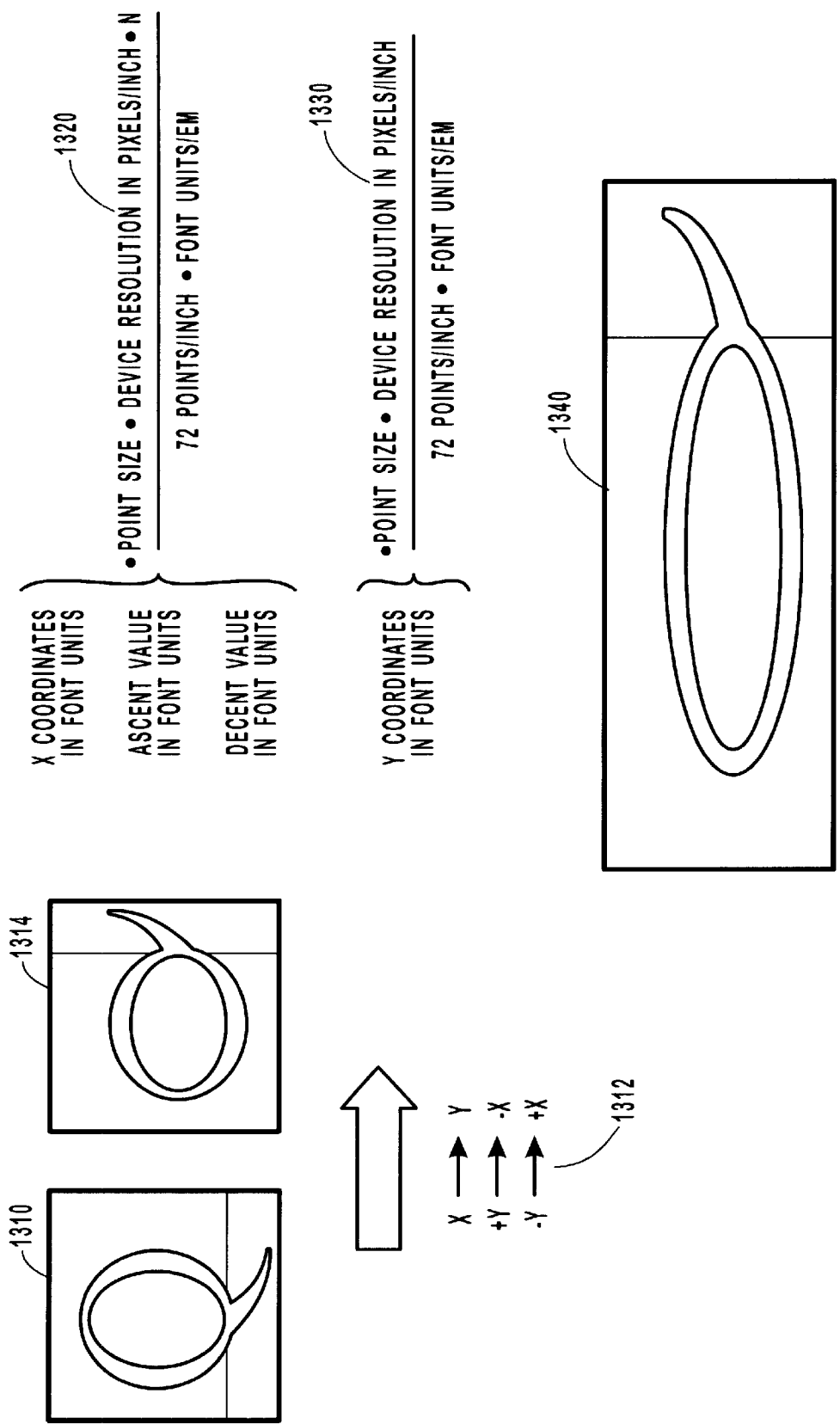
FIG. 13 is an example which illustrates the operation of the method depicted in FIG. 12.

FIG. 12 is a high level flow diagram of a second method 806" for effecting the overscaling (or oversampling) process 806. FIG. 13 illustrates an example of the operation of the method 806" of FIG. 12. First, as shown in step 1210, the font vector graphics (e.g., the character outline), point size and display resolution are accepted. This information is denoted 1310 in FIG. 13. Font metrics such as the left side bearing and advance width may also be accepted. As shown in step 1220, the overscale factor or oversample rate (Recall N of equation 2.) is accepted. Then, as shown in decision step 1230, it is determined whether the sub-pixel elements of the display are arranged in the order R-G-B or B-G-R for example. If the sub-pixel elements are arranged in the order R-G-B, the font vector graphics (e.g., the character outline) 1310 is rotated by 90 degrees, counterclockwise. Referring to FIG. 13, this transformation may be effected by changing the original X coordinate values to new Y coordinate values and by inverting the original Y coordinate values to generate new X coordinate values as denoted by 1312. Processing then continues to step 1260. Returning to decision step 1230, if the sub-pixel element are arranged in the order B-G-R, the font vector graphics (e.g., the character outline 1310 is rotated by 90 degrees clockwise. This transformation may be effected by changing the original X coordinates to new Y coordinates and by changing the original Y coordinates to X coordinates. Note that in the foregoing examples, it was assumed that there were no negative X values—that is, that the Y axis was to the left of the font vector graphics (e.g., 1310). In instances in which there may be negative X coordinate values, the X values are inverted to generate Y values in the case of a 90 degree clockwise rotation. Processing then continues to step 1260.

At step 1260, the rotated font vector graphics (e.g., the character outline) 1110 is rasterized based on the point size, display resolution and the overscale factor (or oversample rate). As shown in the example of FIG. 13, the new Y coordinate values of the character outline (in units of font units), as well as the advance width and left side bearing (also in units of font units) are scaled as shown in 1330 (Recall equation 1.). These values may then be rounded to the nearest integer pixel value. On the other hand, the new X coordinate values of the character outline (in units of font units), as well as ascent and descent values (also in units of font units) are overscaled (or oversampled) as shown in 1320 (Recall equation 2.) and rounded to the nearest integer scan conversion source sample value. The resulting data 1340 is the character outline in units of pixels in the new Y direction and units of scan conversion source samples in the new X direction. Returning to FIG. 12, the method 806" is left via RETURN node 1270.

Although the first method 806' is easier to implement, the second method 806" provides certain data access advantages in certain embodiments, when accessing the data 1340 during a scan conversion process 812. These advantages are described in § 4.2.2.1.1.3 below with reference to FIGS. 20A and 20B.

Referring back to FIG. 8, once the overscaling (or oversampling) process 806 is performed, the optional hinting process 808 may be performed. This process 808 is described in § 4.2.2.1.1.2 below.

§ 4.2.2.1.1.2 HINTING

The purpose of hinting (also referred to as "instructing a glyph") is to ensure that critical characteristics of the original font design are preserved when the glyph is rendered at different sizes and on different devices. Consistent stem weights, consistent "color" (that is, in this context, the balance of black and white on a page or screen), even spacing, and avoiding pixel dropout are common goals of hinting. In the past, uninstructed, or unhinted, fonts would generally produce good quality results at sufficiently high resolutions and point sizes. However, for many fonts, legibility may become compromised at smaller point sizes on lower resolution displays. For example, at low resolutions, with few pixels available to describe the character shapes, features such as stem weights, crossbar widths and serif details can become irregular, or inconsistent, or even missed completely. Although the higher resolution afforded by the present invention improves legibility, hinting may still be useful.

Basically, hinting may involve "grid placement" and "grid fitting". Grid placement is used to align a scaled (or overscaled) character within a grid, that is used by a subsequent scan conversion operation, in a manner intended to optimize the accurate display of the character using the available sub-pixel elements. Grid fitting involves distorting character outlines so that the character better conforms to the shape of the grid. Grid fitting ensures that certain features of the glyphs are regularized. Since the outlines are only distorted at a specified number of smaller sizes, the contours of the fonts at high resolutions remain unchanged and undistorted.

In grid placement, sub-pixel element boundaries may be treated as boundaries along which characters can, and should, be aligned or boundaries to which the outline of a character should be adjusted.

In many cases, hinting involves aligning the left edge of a character stem with a left pixel or sub-pixel element boundary and aligning the bottom of the character's base along a pixel component or sub-pixel element boundary. Experimental results have shown that in the case of vertical striping, characters with stems aligned so that the character stem has a blue or green left edge generally tend to be more legible than characters with stems aligned to have a red left edge. Accordingly, in at least some embodiments, when hinting characters to be displayed on a screen with vertical striping, blue or green left edges for stems are favored over red left edges as part of the hinting process. In the case of horizontal striping, characters aligned so that the bottom of character features in general, and especially horizontal character features (such as crossbars in the letters A and H and bottom features of the letters E and Z, for example), has a red or blue bottom edge generally tend to be more legible than characters with bases aligned to have a green bottom edge. Accordingly, when hinting characters to be displayed on a screen with horizontal striping, in at least some embodiments, red or blue bottom edges are favored over green bottom edges as part of the hinting process.

Figure 14:
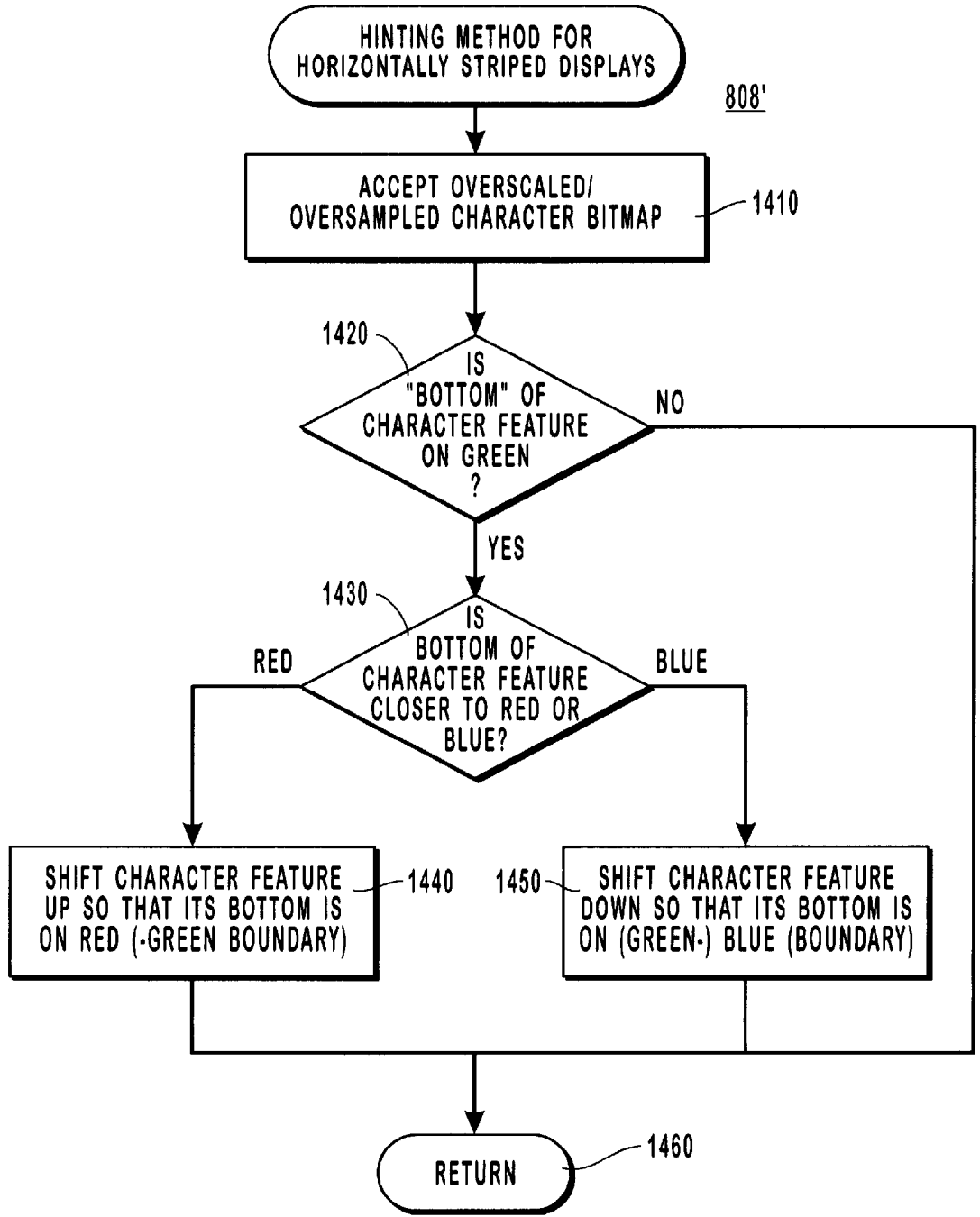
FIG. 14 is a high level flow diagram of a method for effecting a hinting process.
Figure 15A:
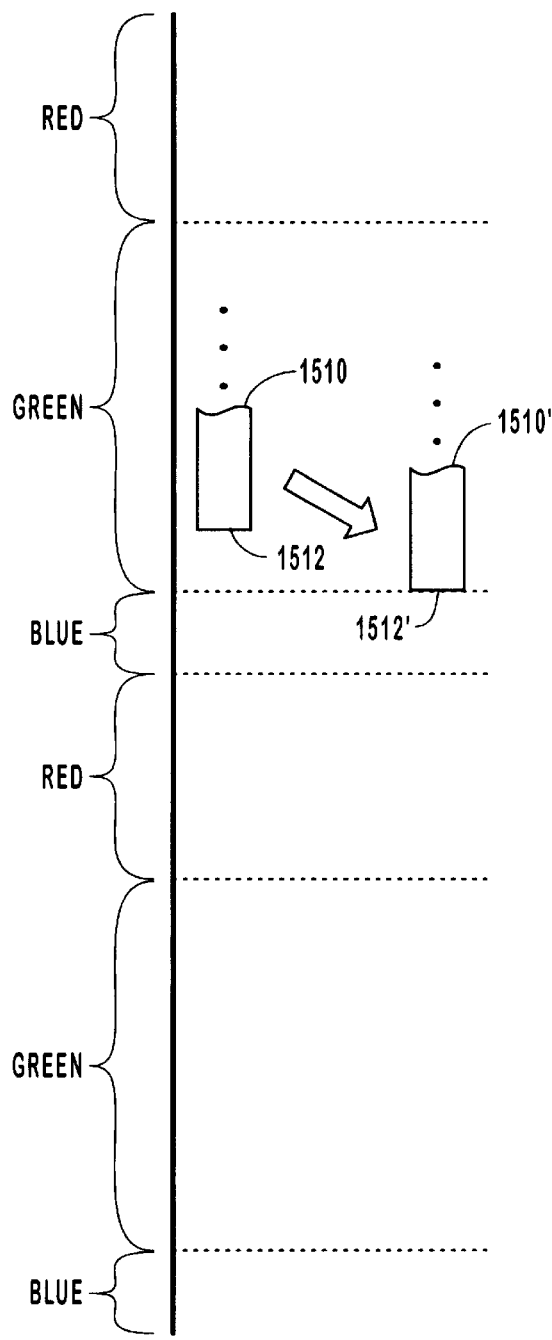
FIGS. 15A and 15B are examples which illustrate the operation of the hinting method of FIG. 14.
Figure 15B:
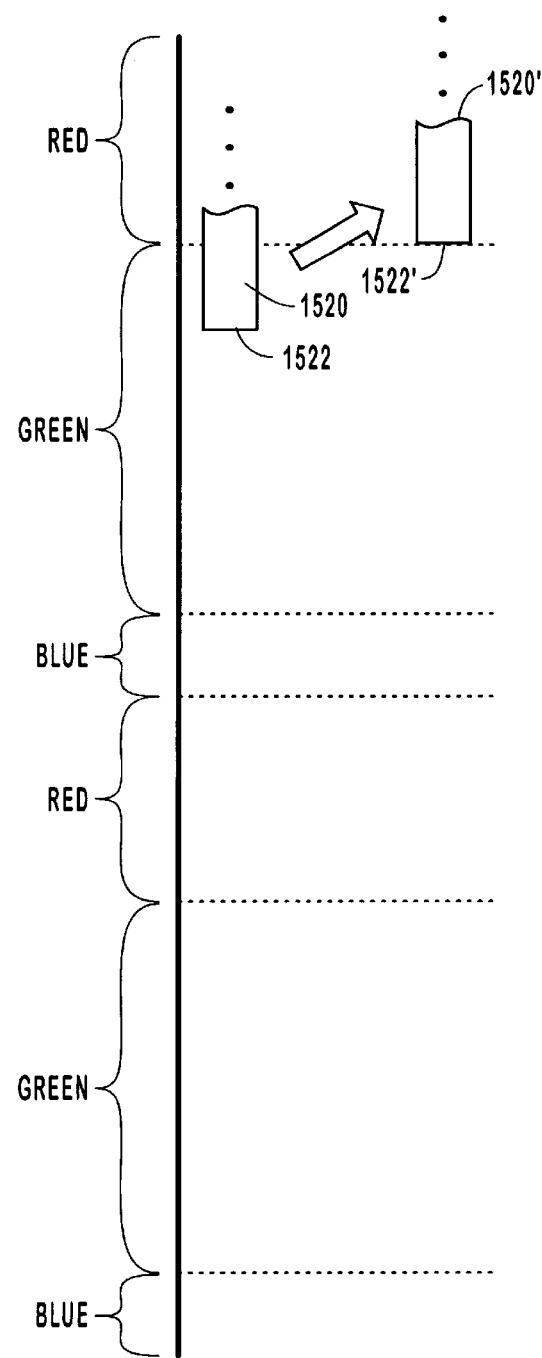

FIG. 14 is a high level flow diagram of an exemplary method 808' for effecting at least a part of a hinting process 808. FIGS. 15A and 15B illustrate the operation of the method 808' of FIG. 14. First, as shown in step 1410, the overscaled or oversampled character bitmap is accepted. As just described above, if the bottom of the character feature is on a scan conversion source sample that will be scan converted to a green sub-pixel element, it should be shifted (or distorted) to scan conversion source samples to be scan converted to a blue or a red sub-pixel element, or to a scan conversion source sample adjacent to a scan conversion source sample to be scan converted to a blue or a red sub-pixel element. Therefore, as shown at decision step 1420, if the bottom of the character feature is not on a scan conversion source sample to be scan converted to a green sub-pixel element, the method 8081 is left via RETURN node 1460. On the other hand, if the bottom of the character feature is on a scan conversion source sample to be scan converted to a green sub-pixel element, processing branches to decision step 1430 where it is determined whether or not the bottom of the character feature is closer to a scan conversion source sample to be scan converted to a red sub-pixel element or a scan conversion source sample to be scan converted to a blue sub-pixel element. In the former case, the character feature outline is shifted (or compressed) up so that its bottom is on a scan conversion source sample to be scan converted to a red sub-pixel element as shown in step 1440. In the latter case, the character feature outline is shifted (or stretched) down so that its bottom is on (or immediately adjacent to) a scan conversion source sample to be scan converted to a blue sub-pixel element as shown in step 1450. In either case, the method 808' is left via RETURN node 1460'.

FIGS. 15A and 15B illustrate the operation of the method 808' of FIG. 14 on character outlines in an overscaled or oversampled character outline which is to be subject to a weighted scan conversion in which five (5) scan conversion source samples will be used to derive a red sub-pixel element, nine (9) scan conversion source samples will be used to derive a green sub-pixel element, and two (2) scan conversion source samples will be used to derive a blue sub-pixel element. In the example of FIG. 15A, the bottom 1512 of the overscaled or oversampled character feature outline 1510 is at a scan conversion source sample to be scan converted to a green sub-pixel element but is close to the scan conversion source samples to be scan converted to a blue sub-pixel element. Accordingly, the overscaled or oversampled character feature outline is shifted (or stretched) downward such that the bottom 1512' of the resulting overscaled or oversampled character feature outline 1510' is on the scan conversion source sample which is immediately adjacent to a scan conversion source sample to be scan converted to a blue sub-pixel element. In the example of FIG. 15B, the bottom 1522 of the overscaled or oversampled character feature outline 1520 is at a scan conversion source sample to be scan converted to a green sub-pixel element but is close to the scan conversion source samples to be scan converted to a red sub-pixel element. Accordingly, the overscaled or oversampled character feature outline is shifted (or compressed) upward such that the bottom 1522' of the resulting overscaled or oversampled character feature outline 1520' is on the scan conversion source sample to be scan converted to a red sub-pixel element.

Other hinting instructions, known to those skilled in the art, may also be carried out on the overscaled or oversampled character outline. Note however, that the additional vertical resolution afforded by considering sub-pixel elements may make performing certain hinting instructions unnecessary.

Once the hinting process 808 is completed, or if the hinting process 808 is not to be performed, once the overscaling (or oversampling) process 806 is complete, a scan conversion process 812 is performed. The scan conversion process is described in § 4.2.2.1.1.3 below.

§ 4.2.2.1.1.3 SCAN CONVERSION

Basically, the scan conversion process 812 converts the overscaled (or oversampled) geometry representing a character into a bitmap image. Conventional scan conversion operations treat pixels as individual units into which a corresponding portion of the scaled image can be mapped. Accordingly, in conventional scan conversion operations, the same portion of an image is used to determine the luminous intensity values to be used with each of the red, green and blue sub-pixel elements of a pixel element into which a portion of the scaled image is mapped. Recall that FIG. 3 illustrates an example of a known scan conversion process which involves sampling an image to be represented as a bitmap and generating luminous intensity values from the sampled values.

In the scan conversion process 812 of the text enhancement system, the red, green and blue sub-pixel elements of a pixel are treated as independent luminous intensity elements. Accordingly, each sub-pixel element is treated as a separate luminous intensity component into which a different portion of the overscaled (or oversampled) image can be mapped. By allowing different portions of a overscaled (or oversampled) image to be mapped into different sub-pixel element, a higher degree of resolution than with the known scan conversion techniques is provided. Stated in another way, different portions of the overscaled (or oversampled) image are used to independently determine the luminous intensity values to be used with each sub-pixel element. Thus, the scan conversion process can be thought of as filtering (e.g., averaging) displaced samples. The displaced samples may be overlapping, one immediately adjacent to the next, and/or one spaced from the next.

Recall that FIG. 6 illustrates an exemplary scan conversion process 812 which may be used in the text enhancement system. In the illustrated embodiment, different image samples 630, 632, 634 of the image 610 segmented by the grid 620 are used to generate the red, green and blue intensity values associated with corresponding portions 640, 642, 644 of the bitmap image 650 being generated. Recall that in the example illustrated in FIG. 6, image samples for red and blue are displaced −⅓ and +⅓ of a pixel height in distance from the green sample, respectively.

The scan conversion processes 812 generates red, green and blue (R, G, B) luminance intensity values for each pixel sub-component. These values may be expressed in the form of separate, red, green and blue luminance intensity levels.

Having provided a brief overview of the scan conversion process 812, two (2) exemplary methods for effecting the scan conversion process 812 are now described with reference to FIGS. 16 and 17.

Figure 16:
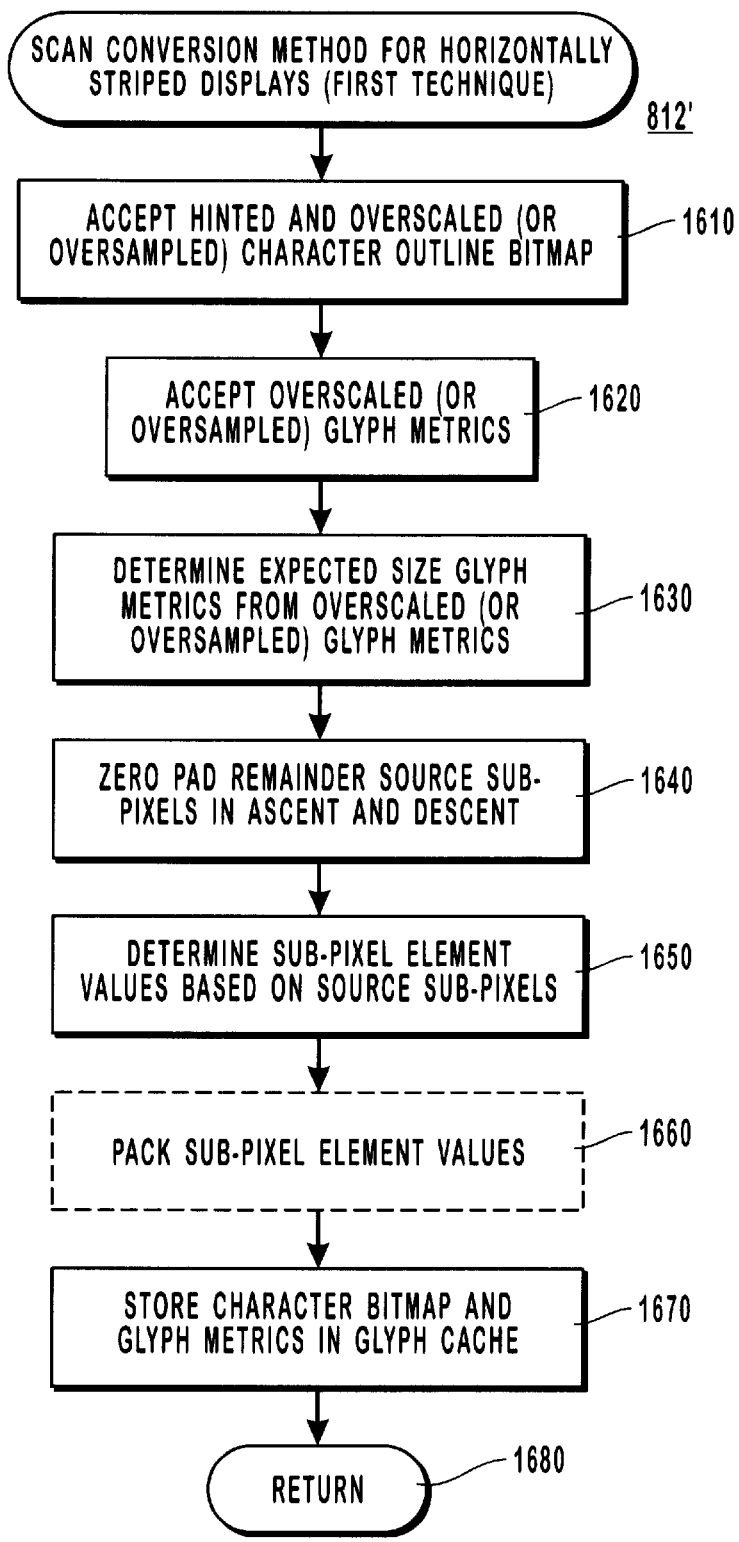
FIG. 16 is a high level flow diagram of a first method for effecting a scan conversion process.

FIG. 16 is a high level flow diagram of an exemplary method 812' for effecting the scan conversion process 812. As shown in step 1610, the hinted and overscaled (or oversampled) character outline bitmap is accepted. Similarly, as shown in step 1620, the overscaled (or oversampled) glyph metrics are also accepted. Then, as shown in step 1630, expected size glyph metrics are determined from the overscaled (or oversampled) glyph metrics. More specifically, since some of the metrics (e.g., the ascent and descent) accepted by the scan conversion process 812 have been oversampled by N (e.g., N=16) in the Y direction (Recall FIGS. 11 and 13.), when converting these overscaled (or oversampled) glyph metrics into expected size (i.e., scaled to the particular output device on which the text is to be rendered) glyph metrics, the ascent (also referred to as the Y component of the left side bearing) and the body or size of the glyph (i.e., the ascent plus the absolute value of the descent) may be determined as follows:

$$\text{ascent} = \text{ceiling (overscaled ascent/N)} \tag{3}$$

$$\text{body height} = \text{ceiling (overscaled ascent/N)} + |\text{ceiling (overscaled descent/N)}| \tag{4}$$

where "ceiling" is an operator which rounds non-integer numbers up to the next greater integer. This step is used to ensure that there will be a complete pixel for scan conversion source samples of the overscaled (or oversampled) character outline bitmap.

Next, as shown in step 1640, remainder scan conversion source samples in the ascent and descent of the character outline are zero padded. More specifically, if the number of scan conversion source samples in the ascent is not evenly divisible by the overscaling (or oversampling) factor N, then additional scan conversion source samples, with a value of zero (0), are added to the ascent of the character outline until the number of scan conversion source samples in the ascent is evenly divisible by the overscaling (or oversampling) factor N. Similarly, if the number of scan conversion source samples in the descent is not evenly divisible by the overscaling (or oversampling) factor N, then additional scan conversion source samples, with a value of zero (0), are added to the descent of the character outline until the number of scan conversion source samples in the descent is evenly divisible by the overscaling (or oversampling) factor N. As will be illustrated later with reference to FIGS. 18A and 18B, this step ensures that the baselines of adjacent characters do not "jump" or "bounce". Note that other techniques which are functionally equivalent to zero padding may be used instead. Such functionally equivalent techniques may include, for example, having the scan conversion process access integer multiples of the overscaling factor (or oversampling rate) of scan conversion source samples above the baseline and ignoring (using masking operations for example) scan conversion source samples above the ascent of the character outline.

Figure 19:
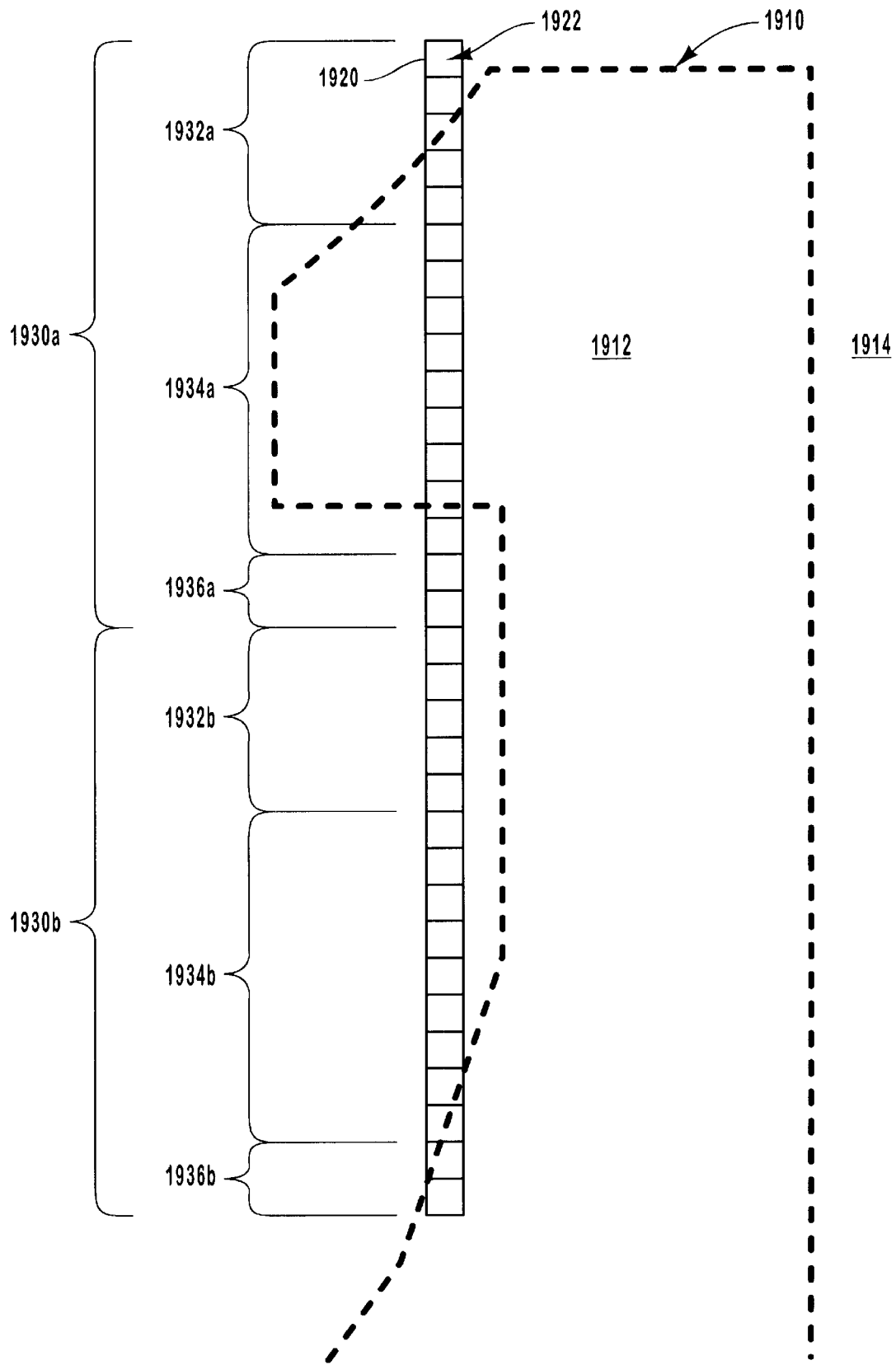
FIG. 19 is an example which illustrates an exemplary scan conversion process.

Next, as shown in step 1650, the sub-pixel element values are determined based on scan conversion source samples. As discussed above, this determination may be made by filtering displaced samples. FIG. 19 illustrates an example of a weighted scan conversion process. This exemplary scan conversion process is termed "weighted" since the intensity value of the red sub-pixel element is based on a sample of five (5) scan conversion source samples, the intensity value of the green sub-pixel element is based on a sample of nine (9) scan conversion source samples, and the intensity value of the blue sub-pixel element is based on a sample of two (2) scan conversion source samples. This weighting may be used since the human eye perceives light intensity from different color light sources at different rates. Green contributes approximately 60%, red approximately 30% and blue approximately 10% to the perceived luminance of a white pixel which results from having the red, green and blue sub-pixel elements set to their maximum luminous intensity output. Thus, when allocating resources, such as luminous intensity levels for example, more levels may be allocated to green than to blue or red. Similarly, more intensity levels may be allocated to red then to blue. However, in some embodiments, equal numbers of intensity levels are assigned to red, green and blue sub-pixel elements. The overscaling (or oversampling) factor in this example was sixteen (16).

In FIG. 19, the dashed line 1910 depicts a part of an overscaled (or oversampled) character outline. Reference number 1912 denotes an area within the character outline 1910, while reference number 1914 denotes an area outside of the character outline 1910. FIG. 19 illustrates scan conversion source samples corresponding to two (2) pixels, having six (6) sub-pixel elements, of the display on which the character 1910 is to be rendered. In this example, the filtering operation simply adds the number of samples in which the center 1922 of the scan conversion source sample 1920 lies within or on the overscaled (or oversampled) character outline 1910. Alternatively, the number of scan conversion source samples which are at least 50% within the character outline 1910 may be used. Notice that the topmost source sub-pixel has been zero padded so that the ascent of the character outline 1910 is evenly divisible by sixteen (16). (Recall step 1640.) In the first set 1930a of scan conversion source samples, the red value 1932a is three (3), the green value 1934a is eight (8) and the blue value 1936a is zero (0).

In the second set 1930*b* of scan conversion source samples, the red value 1932*b* is zero (0), the green value 1934*b* is zero (0), and the blue value 1936*b* is two (2).

Referring back to FIG. 16, in optional step 1660, the sub-pixel element values are "packed". In an exemplary embodiment, the sub-pixel element values are packed into a single eight (8) bit value in accordance with the following expression:

$$\text{Packed Pixel Value} = 3 \times (10 \times \text{red} + \text{green}) + \text{blue} \quad (5)$$

Thus, for example, the packed pixel value corresponding the first set 1930*a* of scan conversion source samples is 114 (=3×(10×3 +8)+0) and the packed pixel value corresponding to the second set 1930*b* of scan conversion source samples is 2 (=3×(10×0+0)+2). The packed pixel value will have a value between zero (0) (i.e., when the red, green and blue values are all zero (0)) and 179 (i.e., when the red value is five (5), the green value is nine (9) and the blue value is two (2)).

Next, in step 1670, the character bitmap and glyph metrics are stored in the glyph cache 726. An exemplary data structure of the data stored in the glyph cache 726 is described in § 4.2.2.1.1.4 below. The method 812' is then left via RETURN node 1680.

Figure 17:
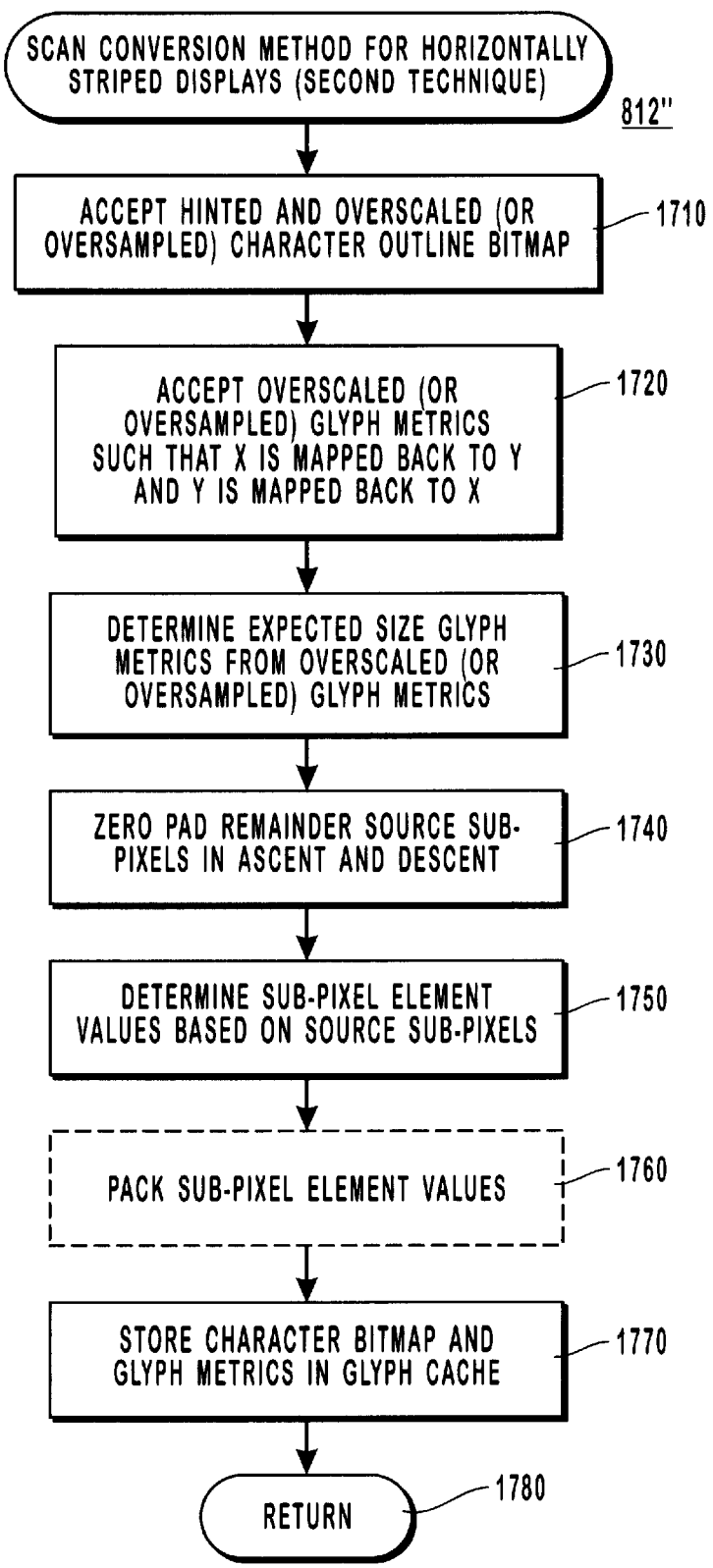
FIG. 17 is a high level flow diagram of a second method for effecting a scan conversion process.

FIG. 17 is a high level flow diagram of an alternative method 812" for effecting a scan conversion process 812. The method 812" of FIG. 17 may be used when the overscaling (or oversampling) method 806" of FIG. 12 is used. Recall from steps 1240 and 1250 of FIG. 12, as well as glyph 1314 of FIG. 13, that the character outline 1310 was rotated by 90 degrees. Thus, in the method of claim 17, the scan converted glyph is rotated back as shown in step 1770. More specifically, in the case of an video display having sub-pixel elements arranged in the order R-G-B, the Y coordinates are mapped to final X coordinates, negative X coordinates are mapped to positive final Y coordinates, and positive X coordinates are mapped to negative final Y coordinates. Such coordinate mapping may be automatically effected by the manner in which scan conversion source samples are accessed (as will become apparent in the description of FIG. 20B below). Otherwise, the method 812" of FIG. 17 is similar to that of FIG. 16.

Figure 9:
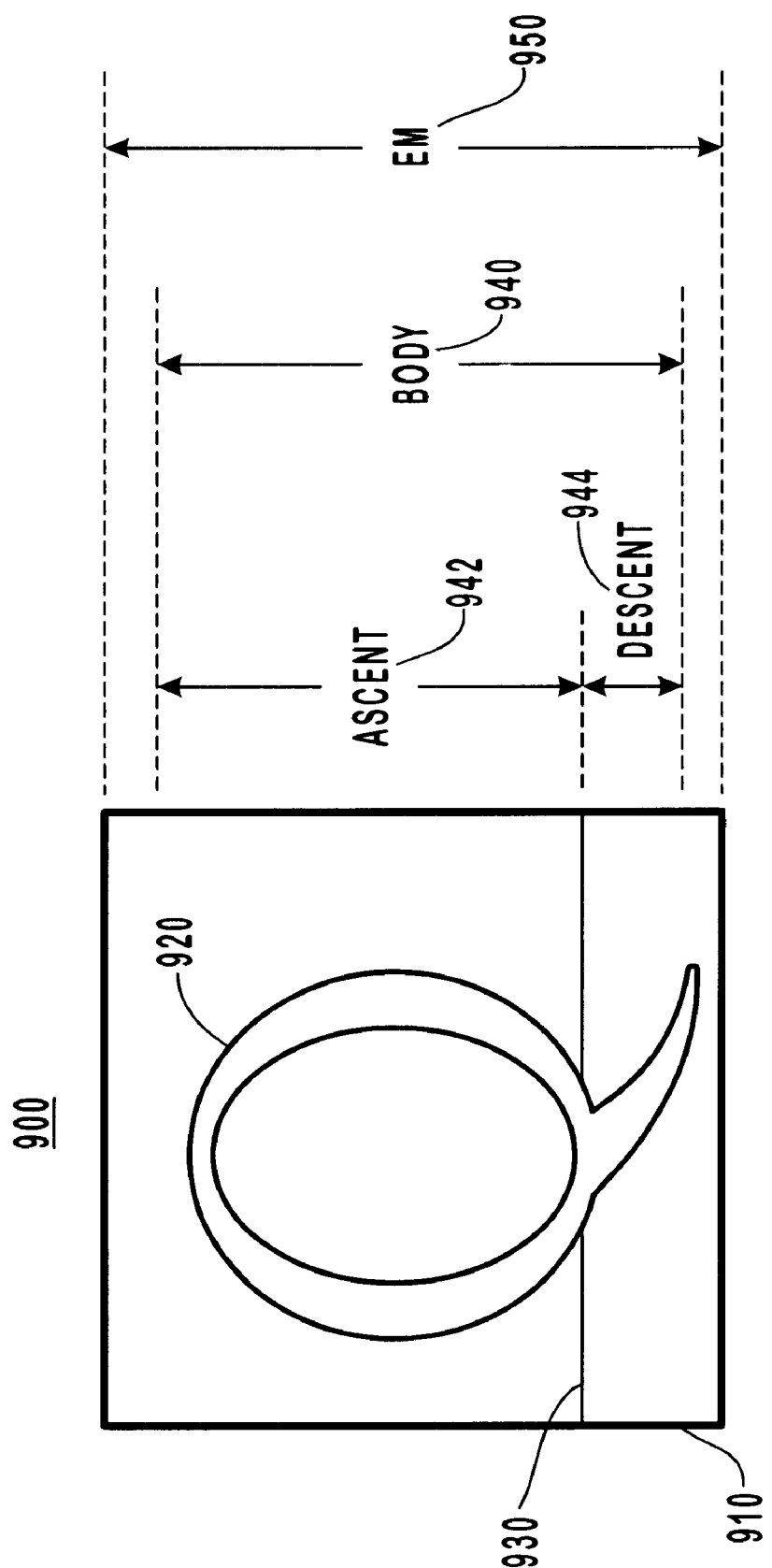
FIG. 9 illustrates certain typographic terms which are used when describing certain aspects of the present invention.
Figure 20A:
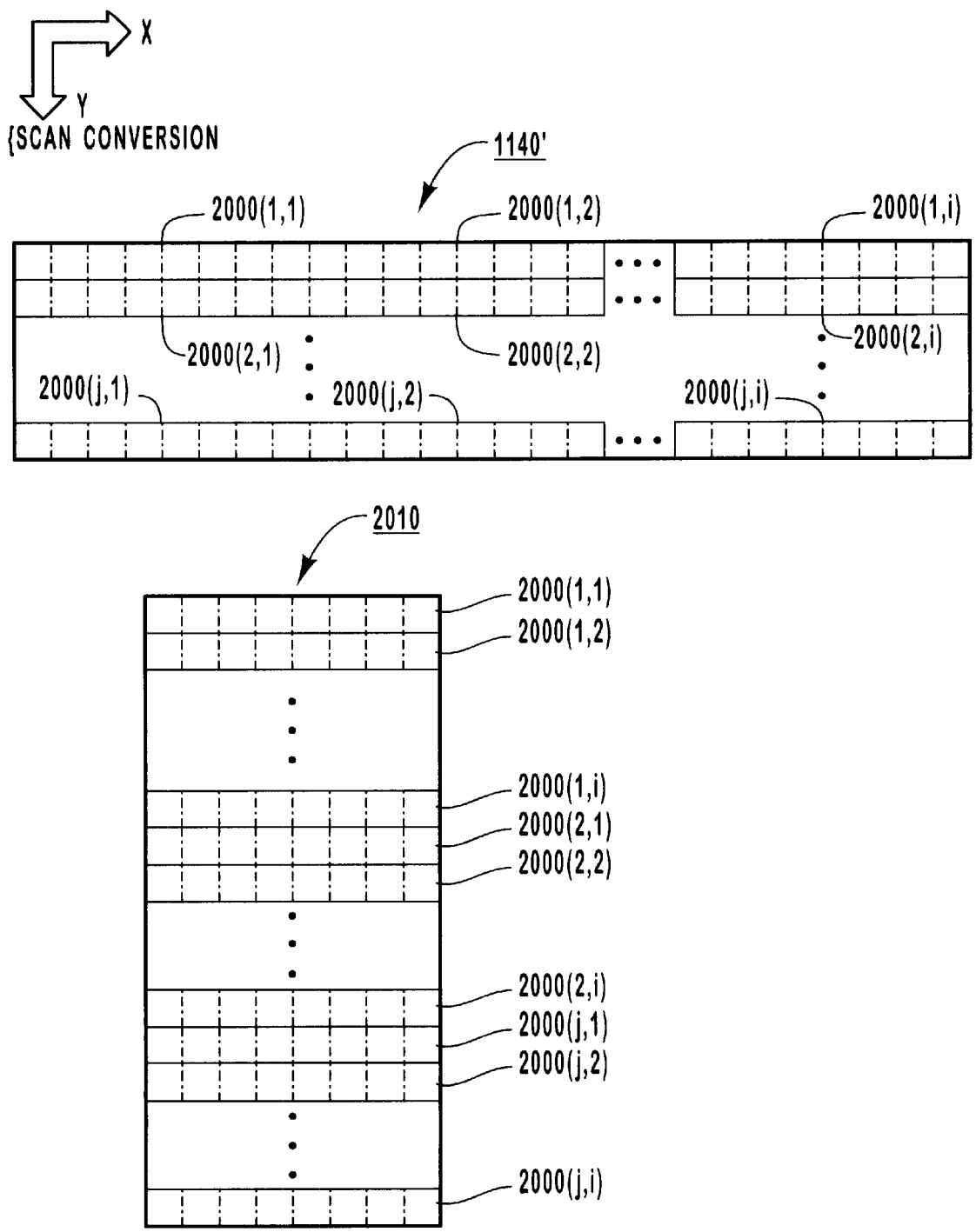
FIGS. 20A and 20B illustrate the storage and retrieval of scan conversion source samples (or more generally, information).
Figure 20B:
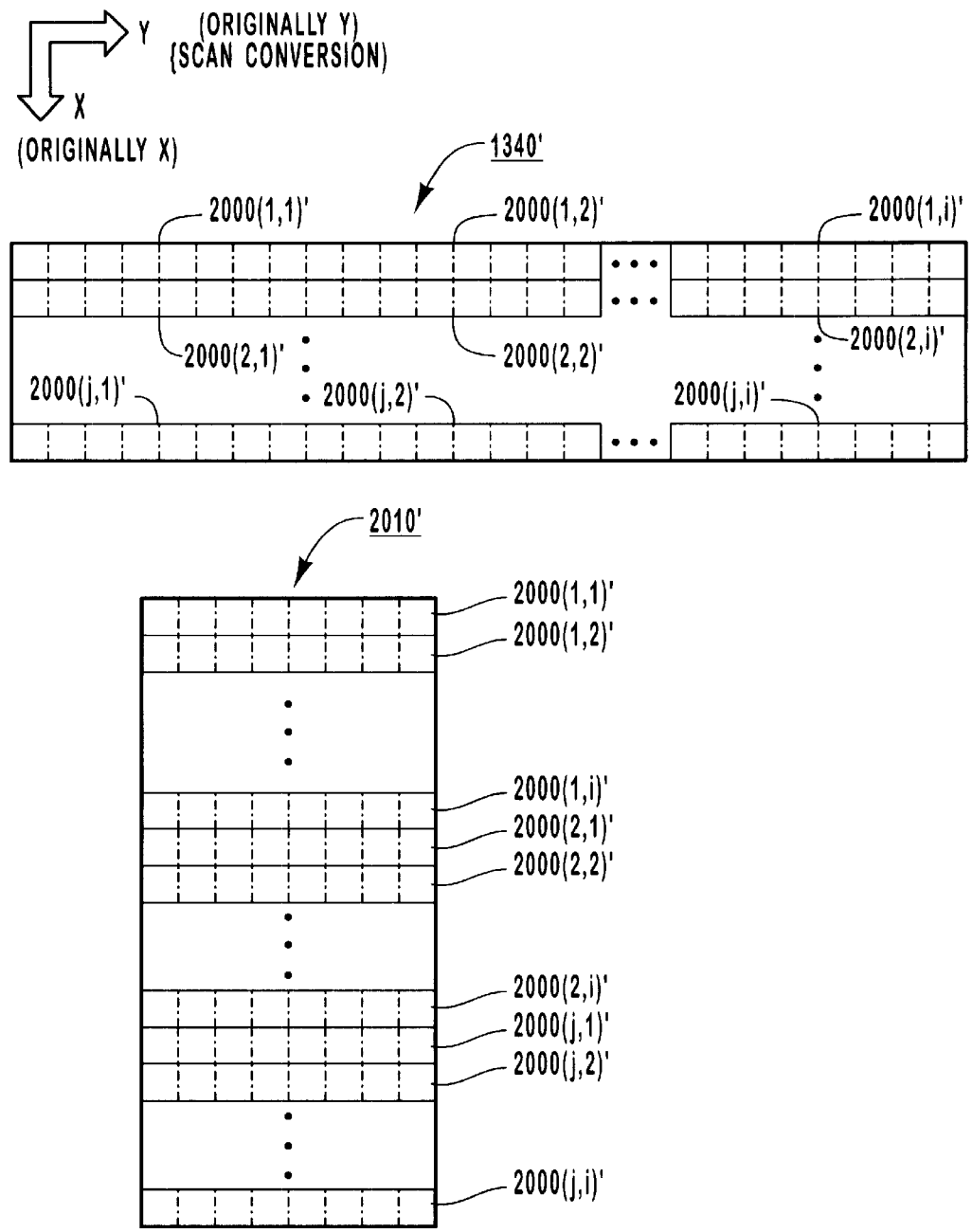

As discussed in § 4.2.2.1.1.1 above, the overscaling (or oversampling) method 806" of FIG. 12 stores scan conversion source sample information in a way that may be easier to access by a scan conversion process 812, such as the scan conversion method 812" of FIG. 17 than when overscaling (or oversampling) method 806' of FIG. 10 stores scan conversion source sample information. FIGS. 20A and 20B illustrate this difference in the ease of accessing scan conversion source sample information by the scan conversion process 812. As shown in FIG. 20A, scan conversion source sample information from the overscaled (or oversampled) character outline 1140 may broken into a number of bytes, from left to right and top to bottom and stored as a series of bytes denoted by reference number 2010. Since the scan conversion process 812 is accessing a number (e.g., 16) of consecutive scan conversion source samples in the Y direction, it will have to, for example, access one (1) bit from byte $2000_{1,1}'$ skip i bytes, access one (1) bit from byte $2000_{2,1}'$ etc. On the other hand, as shown in FIG. 20B, scan conversion source sample information from the rotated and overscaled (or oversampled) character outline 1340 may be broken into a number of bytes from left to right and top to bottom and stored as a series of bytes denoted by reference number 2010'. However, in this case, since the scan conversion is accessing a number (e.g., 16) of consecutive bits in the X direction (which was originally the Y direction), it can merely access two (2) consecutive bytes (such as $2000_{1,1}'$ and $2000_{1,2}'$ for example. If there are scan conversion source samples corresponding to a space between the two of the body 940 of the character outline and the em box 910 (Recall FIG. 9.), an access method which accounts for such offsets, which is described in the context of accounting for left side bearing remainder values in U.S. patent application Ser. No. 09/272,413 filed on Mar. 19, 1999 and entitled "METHODS, APPARATUS, AND DATA STRUCTURES FOR ACCESSING SUB-PIXEL DATA HAVING LEFT SIDE BEARING INFORMATION" (which is expressly incorporated by reference) may be used.

Figure 18A:
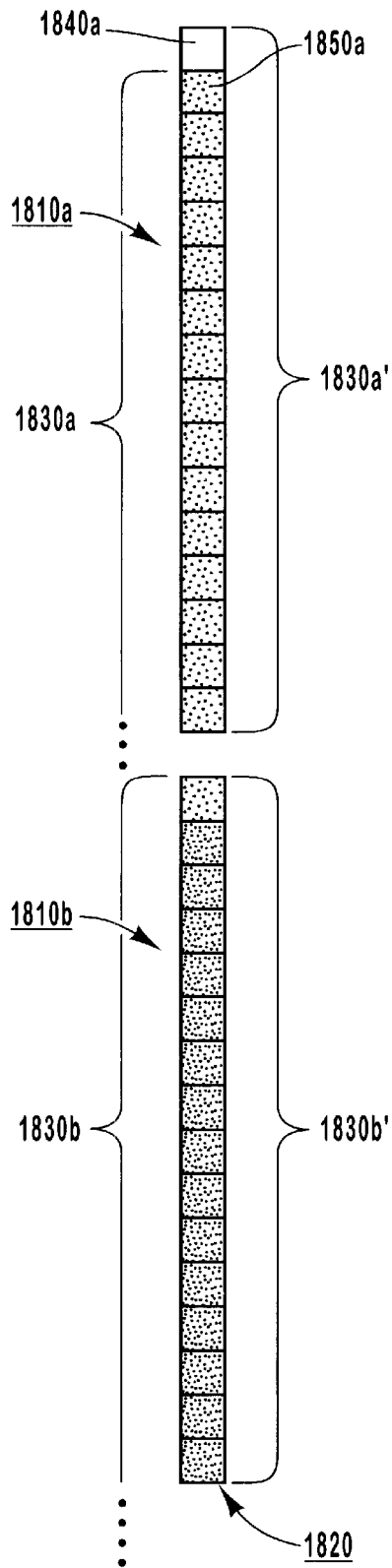
FIGS. 18A and 18B illustrate the usefulness of zero padding steps in the scan conversion methods of FIGS. 16 and 17.
Figure 18B:
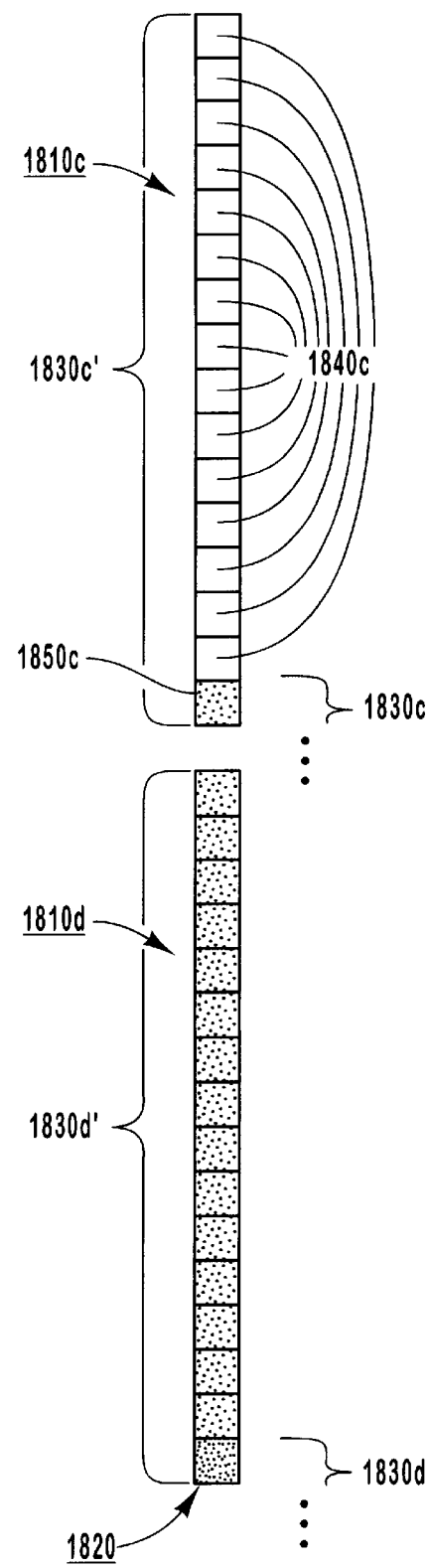

Recall that in step 1640 of FIG. 16 and step 1740 of FIG. 17 that remainder scan conversion source samples in the ascent and descent of the character outline are zero padded. More specifically, recall that if the number of scan conversion source samples in the ascent is not evenly divisible by the overscaling (or oversampling) factor N, then additional scan conversion source samples, with a value of zero (0), are added to the ascent of the character outline until the number of scan conversion source samples in the ascent is evenly divisible by the overscaling (or oversampling) factor N. Similarly, if the number of scan conversion source samples in the descent is not evenly divisible by the overscaling (or oversampling) factor N, then additional sub-pixel source samples, with a value of zero (0), are added to the descent of the character outline until the number of scan conversion source samples in the descent is evenly divisible by the overscaling (or oversampling) factor N. FIGS. 18A and 18B serve to illustrate how these steps prevent the baseline from "jumping" or "bouncing".

In FIG. 18A, it is assumed that source sample 1850*a* is the highest sub-pixel source sample of the overscaled (or oversampled) character outline. Reference number 1810*b* denotes the first 16 (where the overscaling or oversampling factor is 16) scan conversion source samples above the baseline 1820 while reference number 1810*a* denotes the last 16 scan conversion source samples above the baseline 1820. Without zero padding, the first set of samples will take 15 scan conversion source samples from the set 1810*a* and one (1) scan conversion source sample from the next set (not shown). As more sets of samples are processed by the scan conversion process 812, this offset will propagate down such that a set of samples will take 15 scan conversion source samples from the set 1810 above the baseline 1820 and one (1) scan conversion source sample from the first set below the baseline 1820. Effectively, the consequence of not zero padding the top set 1810*a* of scan conversion source samples is that the baseline 1820 will move down one scan conversion source sample. Zero padding the top set 1810*a* of the scan conversion source samples maintains the position of the baseline 1820.

Referring now to FIG. 18B, it is assumed that scan conversion source sample 1850*c* is the highest scan conversion source sample of the overscaled (or oversampled) character outline. Reference number 1810*d* denotes the first 16 (where the overscaling or oversampling factor is 16) scan conversion source samples above the baseline 1820 while reference number 1810*c* denotes the last 16 scan conversion source samples above the baseline 1820. Without zero padding, the first set of samples will take one (1) scan conversion source sample from the set 1810*c* and 15 scan conversion source samples from the next set (not shown). As more sets of samples are processed by the scan conversion process 812, this offset will propagate down such that a set of samples will take one (1) scan conversion source sample from the set 1810*d* above the baseline 1820 and 15 scan conversion source samples from the first set below the baseline 1820. Effectively, the consequence of not zero padding the top set 1810*c* of scan conversion source sample is that the baseline 1820 will move down 15 scan conversion source samples. Zero padding the top set 1810*c* of the scan conversion source samples maintains the position of the baseline 1820. As can be appreciated from a comparison of FIGS. 18A and 18B, without zero padding the scan conversion source samples in the topmost set of N (e.g., N=16) scan conversion source samples, the position of the baseline 1820 might move, or "jump" from one character to the next.

Having described the scan conversion process 812, an exemplary data structure for storing the resulting glyph and glyph metrics is described in § 4.2.2.1.1.4 below.

§ 4.2.2.1.1.4 EXEMPLARY PACKED PIXEL VALUE DATA STRUCTURE

In many systems, R, G and B luminance intensity values are specified, stored and processed as three (3) discrete quantities, each having a number of bits corresponding to the number used to specify sub-pixel element luminance intensity values to the display adapter 548 and/or display device 547. For example, many systems use 8-bit quantities, each representing an R, G or B luminance intensity value. In such an implementation, the processing of R, G and B luminous intensity values requires the storage, processing and transfer of 24 bits per pixel.

In the some devices (such as portable computers and hand held computing devices for example) where memory, processing, and even bus bandwidth are limited resources, using eight (8) bits to represent each R, G, B luminance intensity value throughout the entire rendering process can significantly burden the available resources. To reduce the resources, including memory, required to process and store glyphs, separate R, G, and B luminous intensity level values may be converted, e.g., compressed, into a single number. (Recall steps 1660 and 1760 of FIG. 16 and FIG. 17, respectively, and their associated description in § 4.2.2.1.1.3 above.) To reiterate, this number is referred as a "packed pixel value" because it represents the packing of the R, G and B luminous intensity values associated, with a pixel, into a single value. The range of numbers, e.g., range of packed pixel values, used to represent pixel R, G and B luminous intensity levels, is selected to be large enough so that each possible R, G, B luminous intensity level combination can be uniquely identified. Thus, the total number of packed pixel values, used to represent R, G and B luminous intensity level combinations, should be at least as large as the product of the total number of supported red intensity levels, the total number of supported green intensity levels, and the total number of supported blue intensity levels. Since it is often convenient to work with bytes, i.e., 8-bit quantities, in terms of memory access, processing, and data transfer operations, the product should be able to be specified as an 8-bit quantity or a multiple thereof. In hand held computing devices, a single eight (8) bit per pixel representation of the product of the R, G and B luminance intensity values is particularly desirable because of the significant savings in terms of memory, etc. (as compared to embodiments which use eight (8) bits per sub-pixel element luminous intensity value requiring a total of 24 bits per pixel).

To limit the resource burden associated with rendering images generally, and text images in particular, the scan conversion process 812 may convert separate R, G and B luminous intensity values associated with a pixel into a packed pixel value. In such an embodiment, glyphs are represented, and stored using packed pixel values as opposed to, e.g., separate 8-bit R, G and B luminous intensity values. The packed pixel value representations may be converted into separate R, G, and B luminance values of the form used by the display device 547 before the luminous intensity values are supplied to the display adapter 548.

Converting separate R, G and B luminous intensity levels into packed pixel values may be performed as part of, or as a post process to, the scan conversion process 812. (Recall steps 1660 and 1760 of FIGS. 16 and 17, respectively, described above.) A shift operation or arithmetic equation may be used to convert between separate R, G and B luminance intensity levels associated with a pixel and a packed pixel value.

Such an operation will produce a total of M (O through M−1) distinct packed pixel value entries, where M is the total number of possible R, G and B luminous intensity level combinations that may be assigned to a pixel element. A corresponding R, G and B luminous intensity level combination is associated with each packed pixel value. The R luminous intensity values vary from 0 to RP-1 where RP is the maximum possible number of red luminous intensity levels. The G luminous intensity values vary from 0 to GP-1 where GP is the maximum possible number of green luminous intensity levels. The B luminous intensity values vary from 0 to BP-1 where BP is the maximum possible number of blue luminous intensity levels. Alternatively, packed pixel values may be converted into separate R, G, B luminous intensity values using a look-up table by using the packed pixel value as an index into the look-up table and outputting the individual R, G and B luminous intensity level entries associated with the packed pixel value.

Recall that in the exemplary scan conversion processes 812' and 812" described above, overscaling (or oversampling) in the direction perpendicular to the RGB striping by a factor of sixteen (16) was supported—six (6) red luminous intensity levels were used, e.g., levels 0–5, ten (10) green luminous intensity levels were used, e.g., levels 0–9, and three (3) blue luminous intensity levels were used, e.g., levels 0–2. This results in a total of 180 (=6×10×3) possible R, G and B luminous intensity level combinations. In such an embodiment N would equal 180 and the look-up table would include packed pixel values 0–179.

Note that the number of supported R, G, and B luminous intensity levels is usually a function of the number of scan conversion source samples used to determine the R, G and B luminous intensity levels during the scan conversion process 812. Note also that in the exemplary embodiment where 180 possible R, G, B luminance intensity level combinations are supported, each of the packed pixel values 0–179 can be represented using an 8-bit quantity. This significantly lowers storage requirements as compared to embodiments where separate 8-bit values are used for a total of 24 bits per R, G, B combination.

Figure 21:
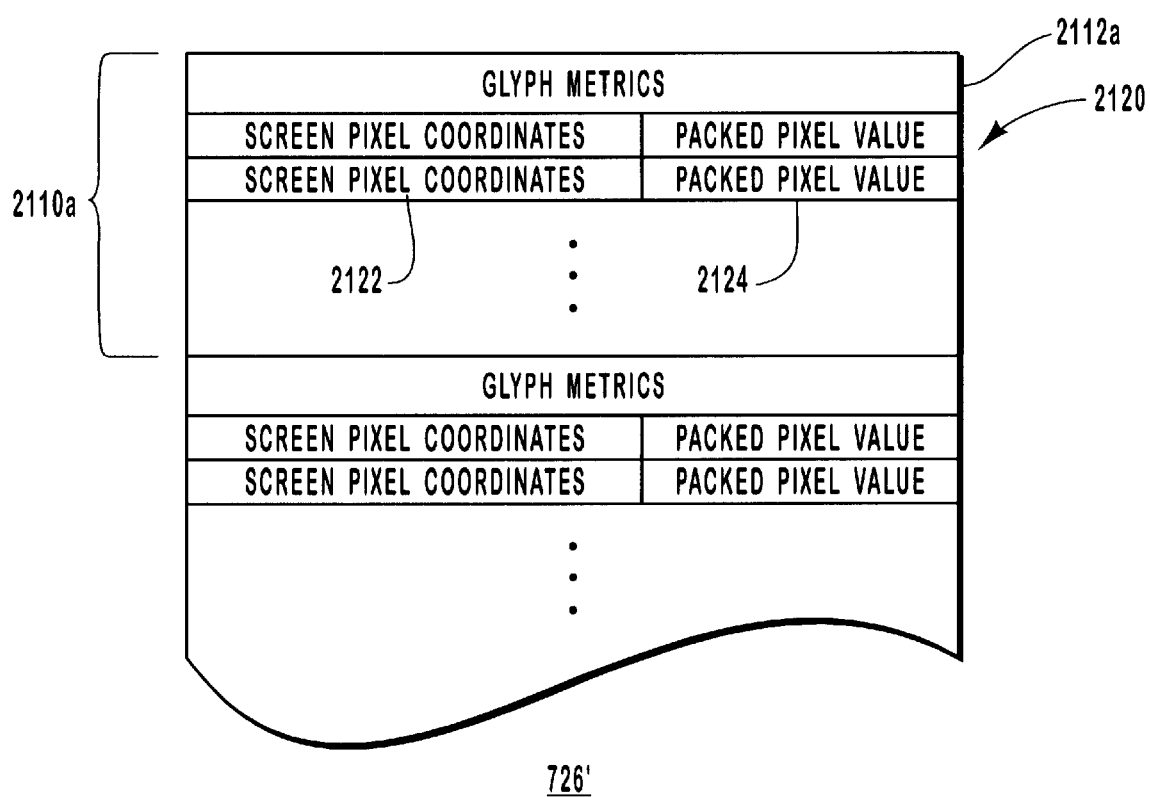
FIG. 21 is an exemplary data structure which may be used to store glyph information in a glyph cache.

FIG. 21 illustrates an example of information which may be stored in the glyph cache 726' by the scan conversion process 812. The glyph cache 726' may include a number of glyph files 2110*a*. Each of the glyph files 2110*a* may include a number of glyph metrics 2112*a* (such as left side bearing, advance width, ascent, descent, etc. for example) and a number of pixel records 2120. Each of the pixel records 2120 may include display screen pixel coordinates 2122 and a packed pixel value 2124.

Having described the graphics display interface process 722, the display driver 723 and its associated processes are described in § 4.2.2.2 below.

§ 4.2.2.2 DISPLAY DRIVER COMPONENTS

The display driver 732 may include software instructions which permit the computer system to communicate information to the video display 547, or video adapter 740, in a way which can be interpreted by the video display 547. Although the display driver 732 is shown outside of the operating system block 535', the display driver 732 may be considered as a part of the operating system 535'. As shown in FIG. 7, the display driver 732 may include a display driver management process 735 which can accept display information 724' and which manages a color compensation (or color filtering) process 736, a gamma correction process 737, and a color palette selection process 738. The display information 724' may include the gamma of the display device 547 and the color palette of the display device 547.

Figure 22:
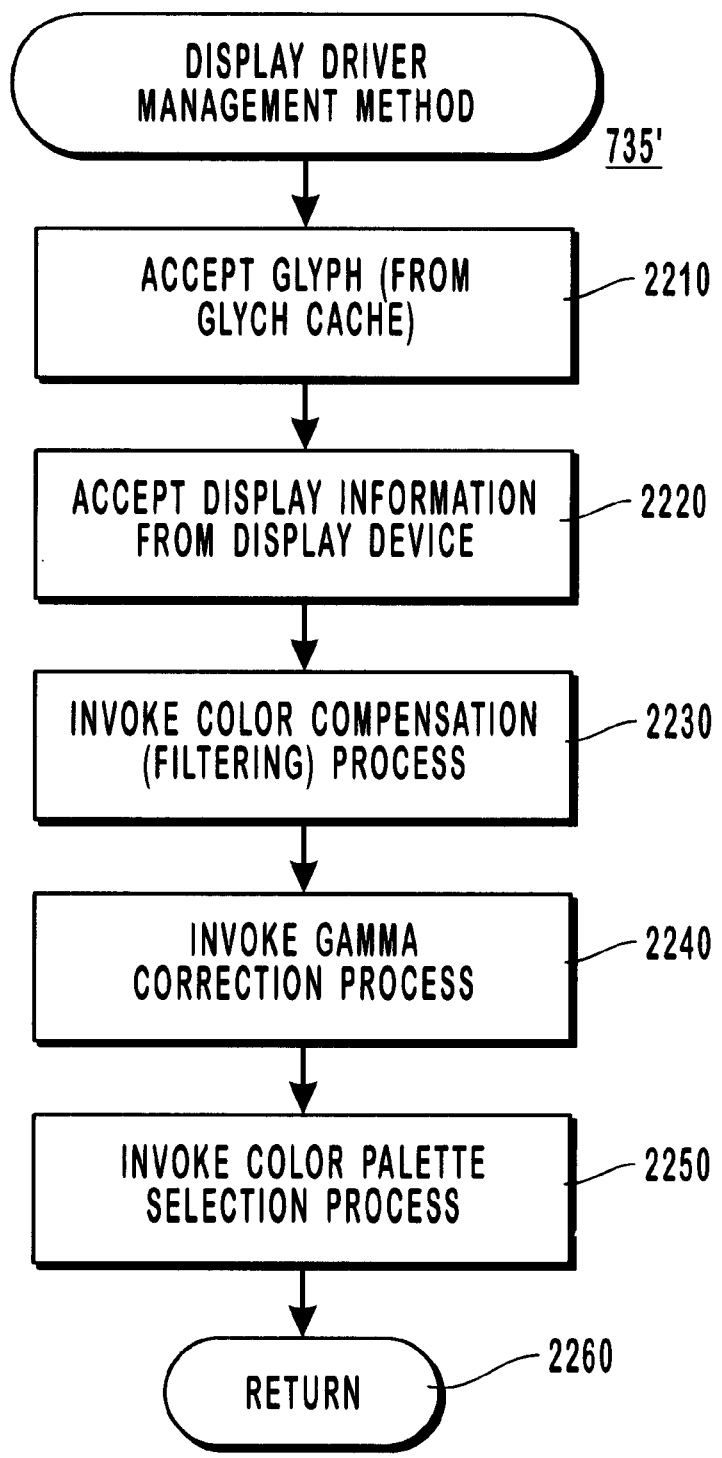
FIG. 22 is a high level flow diagram of an exemplary method for effecting a display driver management process.

FIG. 22 is a high level flow diagram of a method 735' which may be used to effect the display driver management process 735. The display driver management method accepts 735' glyph(s) from the glyph cache 726 and display information from the display device 547 (or display information about the display device 547 from a system configuration file) as shown in steps 2210 and 2220. Then, the method 735' may invoke a color filtering process 736, described in more detail below in § 4.2.2.2.1, in step 2230. The method 735' may also invoke a gamma correction process 737, described in more detail in § 4.2.2.2.2, in step 2240. Finally, the method 735' may invoke a color palette selection process 738, described in more detail below in § 4.2.2.2.3, in step 2250. The method 735' is left via RETURN node 2260.

§ 4.2.2.2.1 COLOR COMPENSATION (FILTERING)

Although the overscaling (or oversampling) and scan conversion processes effectively increase the resolution of the display device in the vertical direction by separately considering the red 210, green 220, and blue 230 sub-pixel elements, if the intensity values of adjacent sub-pixels differ by too much, the resulting display may be visually annoying to a user. The color compensation (color filtering) process 736 is used to decrease intensity differences between certain adjacent sub-pixel elements if the intensity differences are too large.

Figure 23:
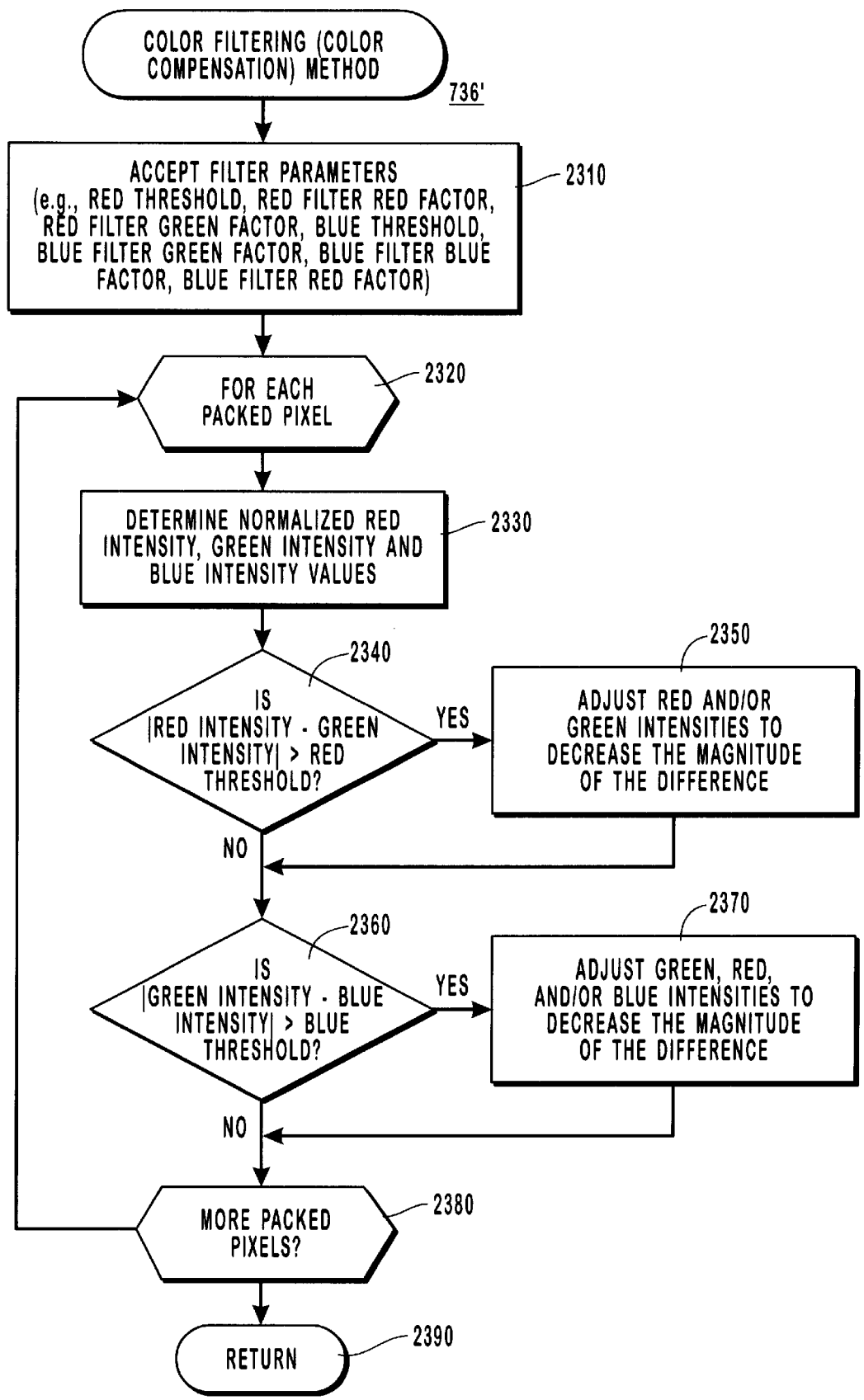
FIG. 23 is a high level flow diagram of an exemplary method for effecting a color compensation (or color filtering) process.

FIG. 23 is a flow diagram of an exemplary method 736' which may be used to effect the color filtering process 736. First, as shown in step 2310, filter parameters are accepted. In this method 736', two (2) filters—namely a red filter and a blue filter are provided. In this case, the red filter uses a threshold, a red factor, and a green factor. The blue filter uses a threshold, a green factor, a blue factor, and a red factor. As shown, the loop defined by steps 2320 and 2380 is run for each packed pixel value of a glyph being processed. Within the loop 2320–2380, normalized red, green and blue intensity values are determined from the packed pixel value as shown in step 2330. More specifically, for example, the color space 0 through 255 may be divided into equal segments based on weighted colors. Thus, for example, if there are five (5) red colors, the color space is divided into five (5) segments, each spaced 255/5 apart. This yields six (6) unique red colors, which are normalized to the color space. Thus, normalized colors can be determined using the following expression:

$$(\text{Total Number of Colors} - \text{Desired Color Index}) * 255 / \text{Total Number of Colors} \quad (6)$$

Then, at decision step 2340, it is determined whether the absolute value (i.e., the magnitude) of the difference between the red and green intensities is greater than the red filter threshold value. If so, as shown in step 2350, the red and green intensities are adjusted to decrease the magnitude of the difference. For example, part of this step may be carried out in accordance with the following expressions:

if (R−G)>Red Filter Threshold, then

R'=R−((R−G)*Red Filter Red Factor)/10

G'=G+((R−G)*Red Filter Green Factor)/10 where R is the original red intensity, G is the original green intensity, R' is the new red intensity, and G' is the new green intensity. Processing then continues to decision step 2360. Returning to decision step 2340, if the absolute value (i.e., the magnitude) of the difference between the red and green intensities is not greater than the red filter threshold, the processing continues directly to decision step 2360.

At decision step 2360, it is determined whether the absolute value (i.e., the magnitude) of the difference between the green (which may have been modified in step 2350) and blue intensities is greater than the blue filter threshold value. If so, as shown in step 2370, the green intensity (as modified in step 2350, if so modified), the blue intensity, and/or the red intensity (as modified in step 2350, if so modified) are modified to decrease the absolute value (i.e., the magnitude) of the difference. For example, part of this step may be carried out in accordance with the following expressions:

if (G−B)>Blue Filter Threshold, then

G'=G−((G−B)*Blue Filter Green Factor)/10

B'=B+((G−B)*Blue Filter Blue Factor)/10

R'=R−((G−B)*Blue Filter Red Factor)/10 where R is the original red intensity (as modified in step 2350, if so modified), G is the original green intensity (as modified in step 2350, if so modified), B is the original blue intensity, R' is the new red intensity, G' is the new green intensity, and B' is the new blue intensity. Processing then continues to step 2380. Returning to decision step 2360, if the absolute value (i.e., the magnitude) of the difference between the green and blue intensities is not greater than the blue filter threshold, the processing continues directly to step 2380. Once all packed pixels of a glyph have been processed, the method 736' is left via RETURN node 2390.

Some sample values for the filter variables are:

Red Filter Threshold=100;

Red Filter Red Factor=3;

Red Filter Green Factor=2;

Blue Filter Threshold=128;

Blue Filter Red Factor=2;

Blue Filter Green Factor=1; and

Blue Filter Blue Factor=3.

Note that although the color filtering process was shown as a part of the display driver 732, it could have been applied to scan converted sub-pixel element intensity values before these values are combined into a packed pixel value instead.

§ 4.2.2.2.2 GAMMA CORRECTION

Many display devices 547 exhibit a non-linear behavior between the input signal and its output. More specifically, if the input signal to the display device 547 is i and the output of the display device 547 is o, the relationship between i and o typically may be expressed as:

$$o = ci^\gamma \quad (7)$$

where c is a constant and γ is an exponent (commonly referred to as the "gamma" of the device) which is typically not one (1). In LCD displays, the gamma is typically less than one (1). To ensure that the perceived grey scale in an image to be rendered on the display 547 is correct, an additional, compensating, non-linear device, typically referred to as a "gamma corrector", is often used. Thus, referring to step 2240 of FIG. 22, a gamma correction process is invoked.

Figure 24:
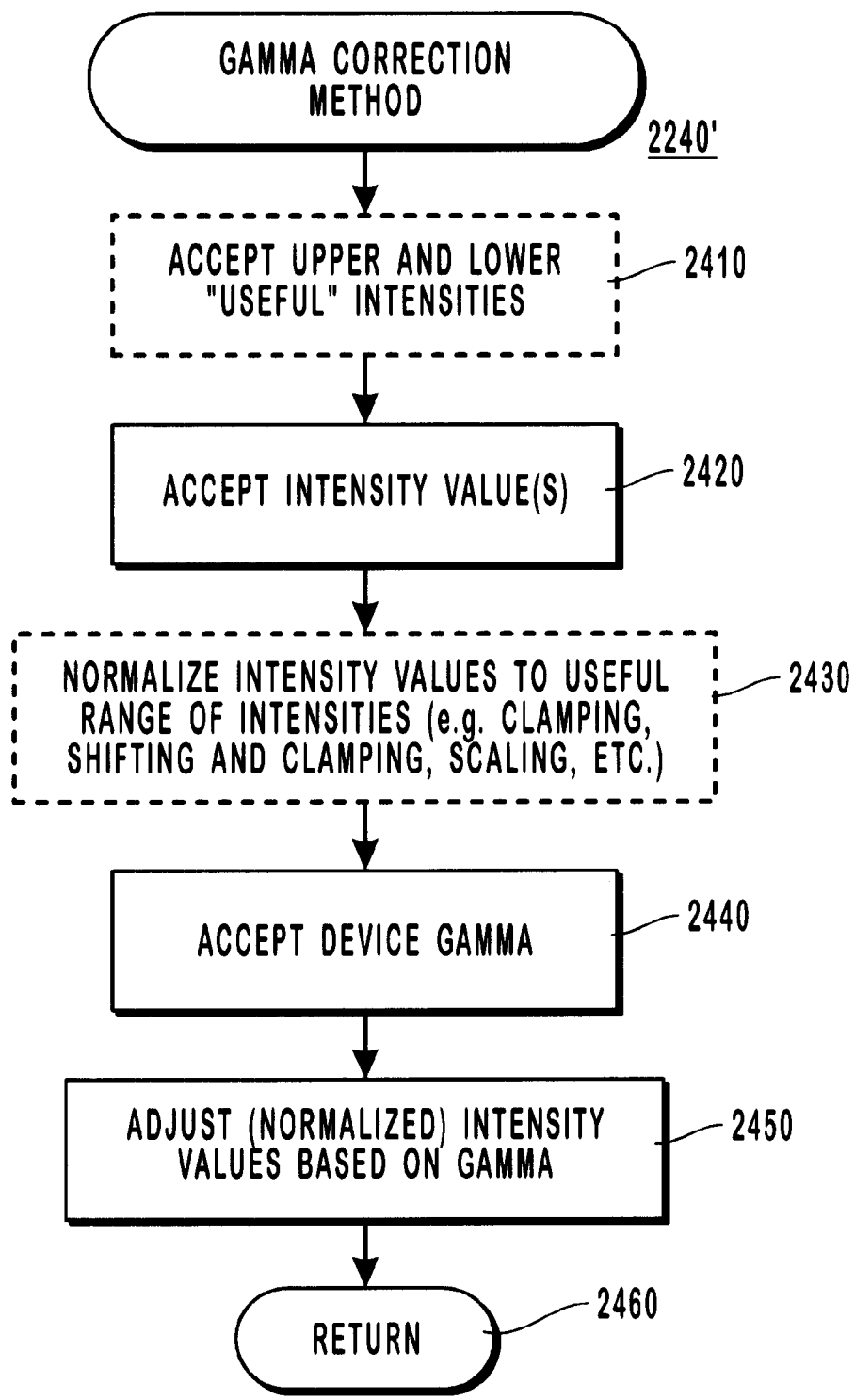
FIG. 24 is a high level flow diagram of an exemplary method for effecting a gamma correction method.

FIG. 24 is a high level flow diagram of an exemplary gamma correction method 2240' which may be used to effect the gamma correction process 2240. This method 2240' may optionally normalize intensity values to a range in which gamma correction is most effective. First, in optional step 2410, upper and lower "useful" intensity values are accepted. These bounds reflect the range of intensities in which gamma correction is most effective. If the range of intensities is from 0 to 255, the lower bound may be 30 and the upper bound may be 250 for example. In step 2420, the intensity value(s) are accepted. Then, in optional step 2430, the intensity values are normalized to the "useful" range of intensities. The normalization may be performed simply by clamping such that intensities below the lower bound are set to the lower bound and intensities above the upper bound are set to the upper bound. Alternatively, the normalization may be performed by shifting and clamping the intensities. In this alternative technique, assuming upper and lower bounds of 30 and 250, the 0 to 255 range of intensities may be shifted up, say 15, to 15 to 270 and clamped such that intensities between 15 and 29 are clamped to 30 and such that intensities between 251 and 270 are clamped to 250. In another alternative, the intensities are scaled and rounded to fall within the "useful" range of intensities. In this case, assuming a lower bound of 30 and an upper bound of 250, the 256 possible values between 0 and 255 would be scaled (and rounded) to 221 possible values between 30 and 250. Naturally, other techniques for normalizing the intensities to the "useful" range may be employed. In step 2440, the gamma of the device 547 is accepted and, in step 2450, the (normalized) intensity values are adjusted based on the gamma of the device 547. The method 2240' is then left via RETURN node 2460.

§ 4.2.2.2.3 COLOR PALETTE SELECTION

Display devices typically have a palette of available colors. Thus, the color, as defined by the color filtered and gamma corrected red-green-blue intensity value triplet, is mapped to a closest available color of the display device 547.

As mentioned above, the display information 724' may be used to select one of the look-up tables included in the set of look up tables to be used. The look-up tables in the set of look-up tables are used for converting packed pixel values, used to represent the glyph, into processed pixel values. The processed pixel values are of a form, such as 8-bit R, G and B luminous intensity values for example, which are used by the display adapter 548' and/or display device 547. Each look-up table includes one entry for each potential packed pixel value and a corresponding output value. In an exemplary case of 180 possible packed pixel values, a look-up table would include 180 packed pixel values and 180 corresponding processed (e.g., output) pixel values. Each output pixel value may be a pre-computed value that is generated by performing the implemented display driver processing operations using the packed pixel value, to which the output pixel value corresponds, as input.

By using the packed pixel values representing a glyph as indexes into the look-up table, a set of processed pixel values including R, G and B luminous intensity values, in the form utilized by the attached display adapter or display device, is obtained.

The processed pixel values included in the look-up table may be pre-computed, that is, computed before use in the display driver 732. By pre-computing the processed pixel values, the need to perform gamma correction, color compensation and/or palette selection operations in real time during image rendering is avoided.

An alternative method to the pixel value look-up table approach may be used. Gamma correction, color compensation and/or palette selection operations may be performed using the packed pixel values as input to generate processed pixel values in a format suitable for use by the display adapter 548' and/or display 547.

§ 4.2.2.3 DISPLAY ADAPTER

A conventional display adapter 548' may be operated in a conventional manner to buffer video grams and to adapt the video frames for output to the display device 547.

§ 4.3 CONCLUSIONS

In view of the foregoing, the present invention disclosed techniques for increasing the resolution of text rendered on a display device having sub-pixel elements, such as an RGB LCD for example, and in particular, on a display device having horizontal striping.

The present invention disclosed techniques for appropriately adjusting metrics associated with the character outline information (such as left side bearing, advance width, vertical character size, etc.).

The present invention also disclosed techniques for preventing "jumping" or "bouncing" baselines.

The present invention also disclosed techniques for compressing red, green and blue luminous intensity values.

The present invention also disclosed techniques for selectively filtering color values when the differences in the intensity of adjacent sub-pixel elements would otherwise be irritating to view.

Finally, the present invention disclosed techniques for correcting the gamma of the pixel values so that the gamma of the display device is considered and so that intensity values of sub-pixel elements fall within a range of intensities in which gamma correction is more useful.

What is claimed is:

1. A method for enhancing the resolution of text to be rendered on a display device having horizontally striped sub-pixel elements, the method comprising steps of:
   a) determining a luminous intensity value of a first sub-pixel element of a pixel based on first information; and
   b) determining a luminous intensity value of a second sub-pixel element of the pixel based on second information,
      wherein the second information is displaced from the first information, and
      wherein each of the steps of determining the luminous intensity value of the first sub-pixel element of the pixel and determining the luminous intensity value of the second sub-pixel element of the pixel includes sub-steps of:
      i) accepting character information and display device resolution information;
      ii) accepting a resolution enhancement overscaling factor; and
      iii) scaling the character information based on the display device resolution information and the resolution enhancement overscale factor.

2. The method of claim 1 wherein each of the steps of determining the luminous intensity value of the first sub-pixel element of the pixel and determining the luminous intensity value of the second sub-pixel element of the pixel further includes a sub-step accepting a point size, and wherein the sub-step of scaling the character information is further based on the point size.

3. The method of claim 1 wherein the character information defines a vertical direction and a horizontal direction and wherein, in the sub-step of scaling the character information, the character information is scaled to a greater degree in a vertical direction than in a horizontal direction.

4. The method of claim 1 wherein the resolution enhancement overscaling factor is greater than one.

5. The method of claim 1 wherein the resolution enhancement overscaling factor is at least three.

6. The method of claim 1 wherein the resolution enhancement overscaling factor is sixteen.

7. The method of claim 1 wherein:

the character information and display device resolution information comprises at least one of (a) an overscaled character bitmap including scan conversion source samples and (b) and oversampled and scaled character bitmap composed of scan conversion source samples; and the resolution enhancement overscaling factor comprises an overscaled glyph metric.

8. The method of claim 7, wherein:

the step of determining the luminous intensity value of the first sub-pixel element of the pixel is performed based on the first information, wherein the first information includes at least one scan conversion source sample; and the step of determining the luminous intensity value of the second sub-pixel element of the pixel is performed based on the second information, wherein the second information includes at least one other scan conversion source sample.

9. The method of claim 1 wherein;

the character information and display device resolution information comprises at least one of (a) an overscaled character bitmap including scan conversion source samples and (b) and oversampled and scaled character bitmap composed of scan conversion source samples; and the resolution enhancement overscaling factor comprises an overscaled ascent value.

10. The method of claim 9 wherein each of the steps of determining the luminous intensity value of the first subpixel element of the pixel and determining the luminous intensity value of the second sub-pixel element of the pixel further comprises the sub-steps of:

determining an expected size ascent integer value and an ascent remainder value from the overscaled ascent value by dividing the overscaled ascent value by an overscaling factor; and if there is a non-zero ascent remainder value, accepting, but ignoring, the values of a number of scan conversion source samples above the overscaled character bitmap.

11. A method for enhancing the resolution of text to be rendered on a display device having horizontally striped sub-pixel elements, the method comprising steps of:

a) determining a luminous intensity value of a first sub-pixel element of a pixel based on first information; and b) determining a luminous intensity value of a second sub-pixel element of the pixel based on second information, wherein the second information is displaced from the first information, and wherein each of the steps of determining the luminous intensity value of the first sub-pixel element of the pixel and determining the luminous intensity value of the second sub-pixel element of the pixel includes sub-steps of:

i) accepting character information and display device resolution information;

ii) accepting a resolution enhancement oversampling factor;

iii) scaling the character information based on the display device resolution information to generate scaled character information; and iv) oversampling the scaled character information based on the resolution enhancement oversampling factor.

12. The method of claim 11 wherein each of the steps of determining the luminous intensity value of the first sub-pixel element of the pixel and determining the luminous intensity value of the second sub-pixel element of the pixel further includes a sub-step accepting a point size, and wherein the sub-step of scaling the character information is further based on the point size.

13. The method of claim 11 wherein the character information defines a horizontal direction and a vertical direction and wherein, in the sub-step of scaling the character information, the character information is sampled to a greater degree in a vertical direction than in a horizontal direction.

14. The method of claim 11 wherein the resolution enhancement oversampling factor is greater than one.

15. The method of claim 11 wherein the resolution enhancement oversampling factor is at least three.

16. The method of claim 11 wherein the resolution enhancement oversampling factor is sixteen.

17. A method for enhancing the resolution of text to be rendered on a display device having horizontally striped sub-pixel elements, the method comprising steps of:

a) determining a luminous intensity value of a first sub-pixel element of a pixel based on first information; and b) determining a luminous intensity value of a second sub-pixel element of the pixel based on second information, wherein the second information is displaced from the first information, and wherein each of the steps of determining the luminous intensity value of the first sub-pixel element of the pixel and determining the luminous intensity value of the second sub-pixel element of the pixel includes sub-steps of:

i) accepting character information and display device resolution information;

ii) accepting a resolution enhancement overscaling factor;

iii) rotating the character information to generate rotated character information; and iv) scaling the rotated character information based on the display device resolution information and the resolution enhancement overscale factor.

18. The method of claim 17 wherein the sub-step of rotating the character information rotates the character information by 90 degrees.

19. The method of claim 18 wherein the character information is rotated counterclockwise by 90 degrees if the display device is an RGB display device.

20. The method of claim 18 wherein the character information is rotated clockwise by 90 degrees if the display device is a BGR display device.

21. The method of claim 17 wherein the resolution enhancement overscale factor is greater than one.

22. The method of claim 17 wherein the resolution enhancement overscale factor is at least three.

23. The method of claim 17 wherein the resolution enhancement overscale factor is sixteen.

24. A method for enhancing the resolution of text to be rendered on a display device having horizontally striped sub-pixel elements, the method comprising steps of:
   a) determining a luminous intensity value of a first sub-pixel element of a pixel based on first information; and
   b) determining a luminous intensity value of a second sub-pixel element of the pixel based on second information,
      wherein the second information is displaced from the first information, and
      wherein each of the steps of determining the luminous intensity value of the first sub-pixel element of the pixel and determining the luminous intensity value of the second sub-pixel element of the pixel includes sub-steps of:
         i) accepting character information and display device resolution information;
         ii) accepting a resolution enhancement oversampling factor;
         iii) rotating the character information to generate rotated character information;
         iv) scaling the rotated character information based on the display device resolution information to generate scaled character information; and
         v) oversampling the scaled character information based on the resolution enhancement oversampling factor.

25. The method of claim 24 wherein each of the steps of determining the luminous intensity value of the first sub-pixel element of the pixel and determining the luminous intensity value of the second sub-pixel element of the pixel further includes a sub-step accepting a point size, and
   wherein the sub-step of scaling the rotated character information is further based on the point size.

26. The method of claim 24 wherein the sub-step of rotating the character information rotates the character information by 90 degrees.

27. The method of claim 26 wherein the character information is rotated counterclockwise by 90 degrees if the display device is an RGB display device.

28. The method of claim 26 wherein the character information is rotated clockwise by 90 degrees if the display device is a BGR display device.

29. The method of claim 24 wherein the resolution enhancement oversample factor is greater than one.

30. The method of claim 24 wherein the resolution enhancement oversample factor is at least three.

31. The method of claim 24 wherein the resolution enhancement oversample factor is sixteen.

32. A machine readable medium having machine readable instructions which, when executed by a machine, perform a method for enhancing the resolution of text to be rendered on a display device having horizontally striped sub-pixel elements, the method comprising steps of:
   a) determining a luminous intensity value of a first sub-pixel element of a pixel based on first information; and
   b) determining a luminous intensity value of a second sub-pixel element of the pixel based on second information,
      wherein the second information is displaced from the first information, and
      wherein each of the steps of determining the luminous intensity value of the first sub-pixel element of the pixel and determining the luminous intensity value of the second sub-pixel element of the pixel includes sub-steps of:
         i) accepting character information and display device resolution information;
         ii) accepting a resolution enhancement overscaling factor;
         iii) rotating the character information to generate rotated character information; and
         iv) scaling the rotated character information based on the display device resolution information and the resolution enhancement overscale factor.

33. A machine readable medium having machine readable instructions which, when executed by a machine, perform a method for enhancing the resolution of text to be rendered on a display device having horizontally striped sub-pixel elements, the method comprising steps of:
   a) determining a luminous intensity value of a first sub-pixel element of a pixel based on first information; and
   b) determining a luminous intensity value of a second sub-pixel element of the-pixel based on second information,
      wherein the second information is displaced from the first information, and
      wherein each of the steps of determining the luminous intensity value of the first sub-pixel element of the pixel and determining the luminous intensity value of the second sub-pixel element of the pixel includes sub-steps of:
         i) accepting character information and display device resolution information;
         ii) accepting a resolution enhancement oversampling factor;
         iii) rotating the character information to generate rotated character information;
         iv) scaling the rotated character information based on the display device resolution information to generate scaled character information; and
         v) oversampling the scaled character information based on the resolution enhancement oversampling factor.

34. An apparatus for use in a system for increasing the resolution of text to be rendered on a display device having horizontally striped sub-pixel elements, the apparatus comprising:
   a) an input for accepting character information, display device resolution information and a resolution enhancement overscaling factor; and
   b) means for scaling the character information based on the display device resolution information and the resolution enhancement overscale factor.

35. The apparatus of claim 34 wherein the input further accepts a point size, and
   wherein the means for scaling the character information scale the character information further based on the point size.

36. The apparatus of claim 34 wherein the character information accepted by the input defines a vertical direction and a horizontal direction and wherein the means for scaling the character information scale the character information to a greater degree in a vertical direction than in a horizontal direction.

37. The apparatus of claim 34 wherein the resolution enhancement overscaling factor is greater than one.

38. The apparatus of claim 34 wherein the resolution enhancement overscaling factor is at least three.

39. The apparatus of claim 34 wherein the resolution enhancement overscaling factor is sixteen.

40. An apparatus for use in a system for increasing the resolution of text to be rendered on a display device having horizontally striped sub-pixel elements, the apparatus comprising:
   a) an input for accepting character information, display device resolution information and a resolution enhancement oversampling factor;
   b) means for scaling the character information based on the display device resolution information to generate scaled character information; and
   c) means for oversampling the scaled character information based on the resolution enhancement oversampling factor.

41. The apparatus of claim 40 wherein the input further accepts a point size, and
   wherein the means for scaling the character information scales the character information further based on the point size.

42. The apparatus of claim 41 wherein the character information defines a horizontal direction and a vertical direction and
   wherein the means for scaling the character information samples the character information to a greater degree in a vertical direction than in a horizontal direction.

43. The apparatus of claim 40 wherein the resolution enhancement oversampling factor is greater than one.

44. The apparatus of claim 40 wherein the resolution enhancement oversampling factor is at least three.

45. The apparatus of claim 40 wherein the resolution enhancement oversampling factor is sixteen.

46. An apparatus for use in a system for increasing the resolution of text to be rendered on a display device having horizontally striped sub-pixel elements, the apparatus comprising:
   a) an input for accepting a character information, display device resolution information and a resolution enhancement overscaling factor;
   b) means for rotating the character information to generate rotated character information; and
   c) means for scaling the rotated character information based on the display device resolution information and the resolution enhancement overscale factor.

47. The apparatus of claim 46 wherein the means for rotating the character information rotates the character information by 90 degrees.

48. The apparatus of claim 46 wherein the means for rotating the character information rotates the character information counterclockwise by 90 degrees if the display device is an RGB display device.

49. The apparatus of claim 46 wherein the means for rotating the character information rotates the character information clockwise by 90 degrees if the display device is a BGR display device.

50. The apparatus of claim 46 wherein the resolution enhancement factor is greater than one.

51. The apparatus of claim 46 wherein the resolution enhancement factor is at least three.

52. The apparatus of claim 46 wherein the resolution enhancement factor is sixteen.

53. An apparatus for use in a system for increasing the resolution of text to be rendered on a display device having horizontally striped sub-pixel elements, the apparatus comprising:
   a) an input for accepting character information, display device resolution information and a resolution enhancement oversampling factor;
   b) means for rotating the character information to generate rotated character information;
   c) means for scaling the rotated character information based on the display device resolution information to generate scaled character information; and
   d) means for oversampling the scaled character information based on the resolution enhancement oversampling factor.

54. The apparatus of claim 53 wherein the input further accepts a point size, and
   wherein the means for scaling the character information scales the character information further based on the point size.

55. The apparatus of claim 53 wherein the means for rotating the character information rotates the character information by 90 degrees.

56. The apparatus of claim 54 wherein the means for rotating the character information rotates the character information counterclockwise by 90 degrees if the display device is an RGB display device.

57. The apparatus of claim 54 wherein the means for rotating the character information rotates the character information clockwise by 90 degrees if the display device is a BGR display device.

58. A method for enhancing the resolution of text to be rendered on a display device having horizontally striped sub-pixel elements, the method comprising steps of:
   a) determining a luminous intensity value of a first sub-pixel element of a pixel based on first information; and
   b) determining a luminous intensity value of a second sub-pixel element of the pixel based on second information,
      wherein the second information is displaced from the first information, and
      wherein each of the steps of determining the luminous intensity value of the first sub-pixel element of the pixel and determining the luminous intensity value of the second sub-pixel element of the pixel includes sub-steps of:
         i) accepting character information and display device resolution information;
         ii) accepting a resolution enhancement overscaling factor;
         iii) scaling the character information based on the display device resolution information and the resolution enhancement overscale factor to generate scaled character information; and
         iv) rotating the scaled character information.

59. A method for enhancing the resolution of text to be rendered on a display device having horizontally striped sub-pixel elements, the method comprising steps of:
   a) determining a luminous intensity value of a first sub-pixel element of a pixel based on first information; and
   b) determining a luminous intensity value of a second sub-pixel element of the pixel based on second information, wherein the second information is displaced from the first information, and wherein each of the steps of determining the luminous intensity value of the first sub-pixel element of the pixel and determining the luminous intensity value of the second sub-pixel element of the pixel includes sub-steps of:
  i) accepting character information and display device resolution information;
  ii) accepting a resolution enhancement oversampling factor;
  iii) scaling the character information based on the display device resolution information to generate scaled character information; and
  iv) oversampling the scaled character information based on the resolution enhancement oversampling factor to generate oversampled character information; and
  v) rotating the oversampled character information.

60. An apparatus for use in a system for increasing the resolution of text to be rendered on a display device having horizontally striped sub-pixel elements, the apparatus comprising:
  a) an input for accepting a character information, display device resolution information and a resolution enhancement overscaling factor;
  b) means for scaling the character information based on the display device resolution information and the resolution enhancement overscale factor to generate scaled character information; and
  c) means for rotating the scaled character information.

61. An apparatus for use in a system for increasing the resolution of text to be rendered on a display device having horizontally striped sub-pixel elements, the apparatus comprising:
  a) an input for accepting character information, display device resolution information and a resolution enhancement oversampling factor;
  b) means for scaling the character information based on the display device resolution information to generate scaled character information;
  c) means for oversampling the scaled character information based on the resolution enhancement oversampling factor to generate oversampled character information; and
  d) means for rotating the oversampled character information.

* * * * *

UNITED STATES PATENT AND TRADEMARK OFFICE
CERTIFICATE OF CORRECTION

PATENT NO. : 6,339,426 B1 Page 1 of 1
DATED : January 15, 2002
INVENTOR(S) : Charlton E. Lui, Leroy B. Keely, Jr., Gregory C. Hitchcock and Ryan E. Cukierman It is certified that error appears in the above-identified patent and that said Letters Patent is hereby corrected as shown below:

<u>Column 3,</u>
Line 26, change "Webbing" to -- Webdings --

<u>Column 17,</u>
Line 65, change "8081" to -- 808' --

<u>Column 21,</u>
Line 33, change "an" to -- a --

Signed and Sealed this

Fourth Day of June, 2002

Attest:

Attesting Officer

JAMES E. ROGAN
*Director of the United States Patent and Trademark Office*